(12) United States Patent
Nakaoka et al.

(10) Patent No.: US 6,567,199 B1
(45) Date of Patent: May 20, 2003

(54) DIGITAL OPTICAL TRANSMISSION APPARATUS AND METHOD FOR PERFORMING ASK MODULATION TO GENERATE BASE BAND COMPONENT WITH CONSTANT DC LEVEL

(75) Inventors: Hiroyuki Nakaoka, Tenri (JP); Hiroshi Uno, Nara (JP); Yoshihiro Ohtani, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/232,007

(22) Filed: Jan. 14, 1999

(30) Foreign Application Priority Data

Jan. 16, 1998 (JP) .............................. 10-006419

(51) Int. Cl.$^7$ ................................ H04B 10/04
(52) U.S. Cl. .................... 359/181; 359/182; 359/110
(58) Field of Search ................. 359/181, 182, 359/110, 135

(56) References Cited

U.S. PATENT DOCUMENTS 4,965,857 A * 10/1990 Auracher et al. ........... 359/181
5,896,211 A *  4/1999 Watanabe .................. 359/124

\* cited by examiner

Primary Examiner—Kinfe-Michael Negash
(74) Attorney, Agent, or Firm—Dike, Bronstein, Roberts & Cushman IP Group Edwards & Angell, LLP; David G. Conlin; David A. Tucker

(57) ABSTRACT

A digital optical transmission apparatus includes a modulation portion for modulating data to be transmitted in an ASK modulation method, and an E/O modulation portion for converting an electrical signal output from the modulation portion into an optical signal having a base band component with a constant DC level. DC-biased or FSK-biased may be employed as a method of making constant the DC level of the base band component.

26 Claims, 37 Drawing Sheets

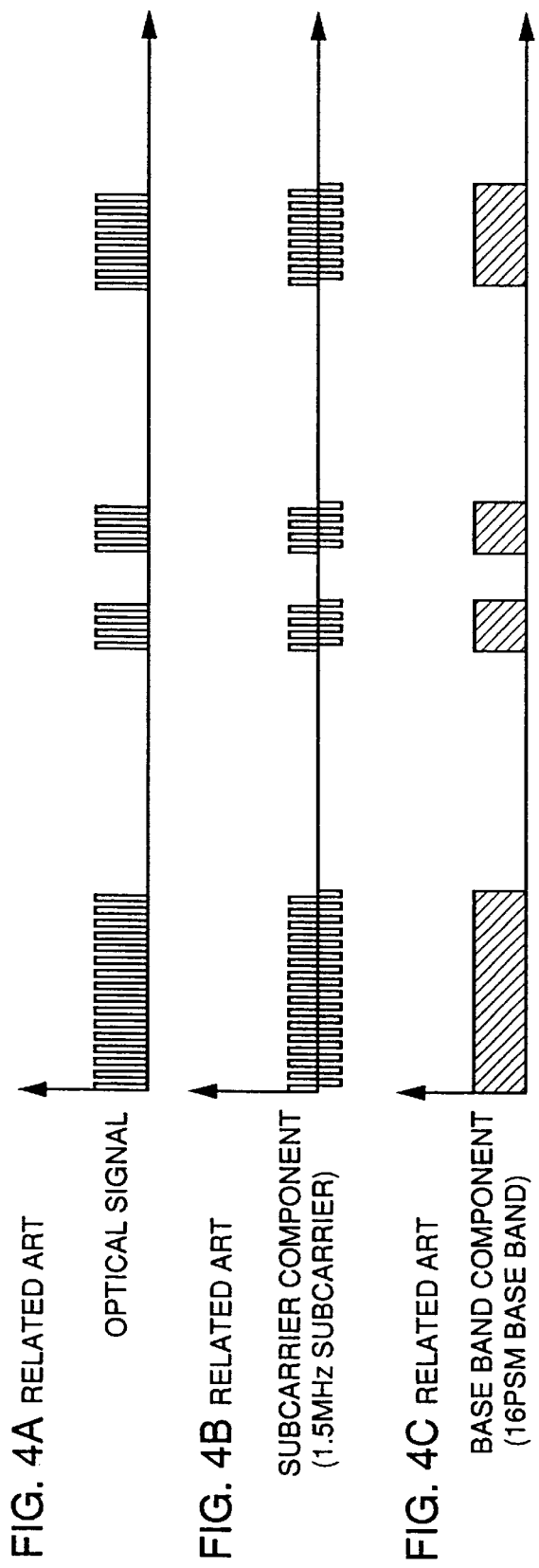

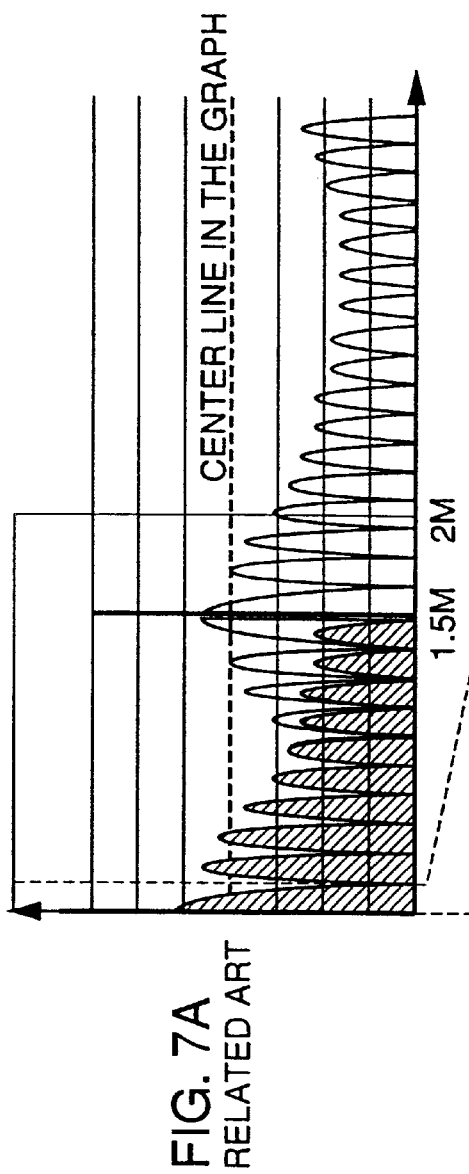
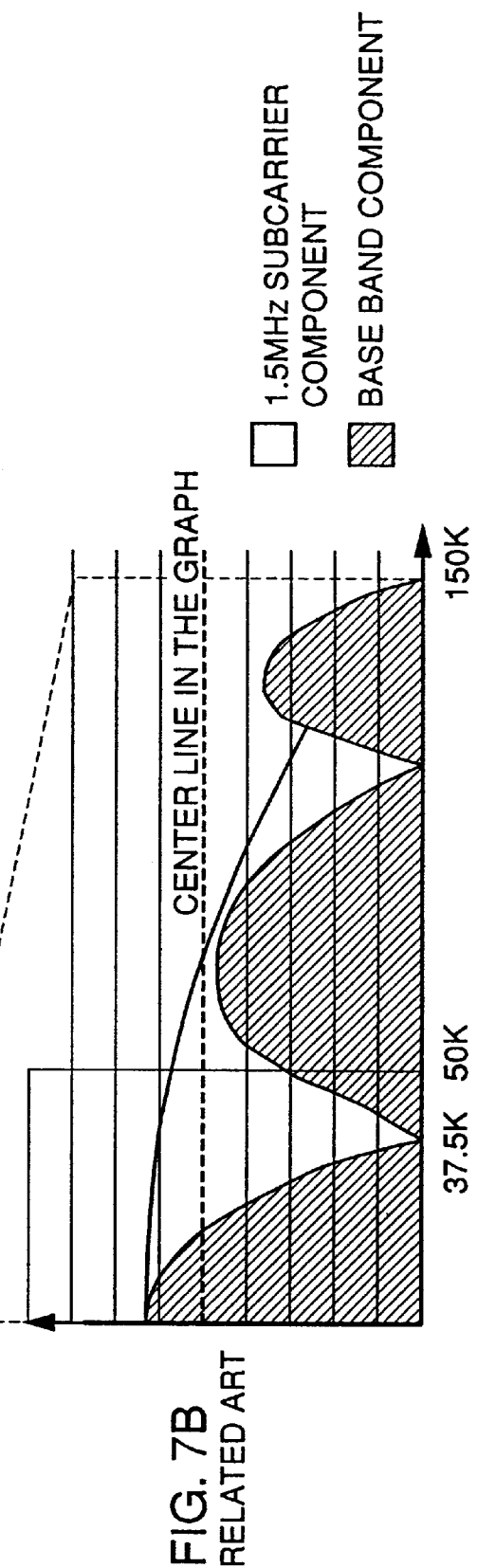
FIG. 7A
RELATED ART
FIG. 7B
RELATED ART

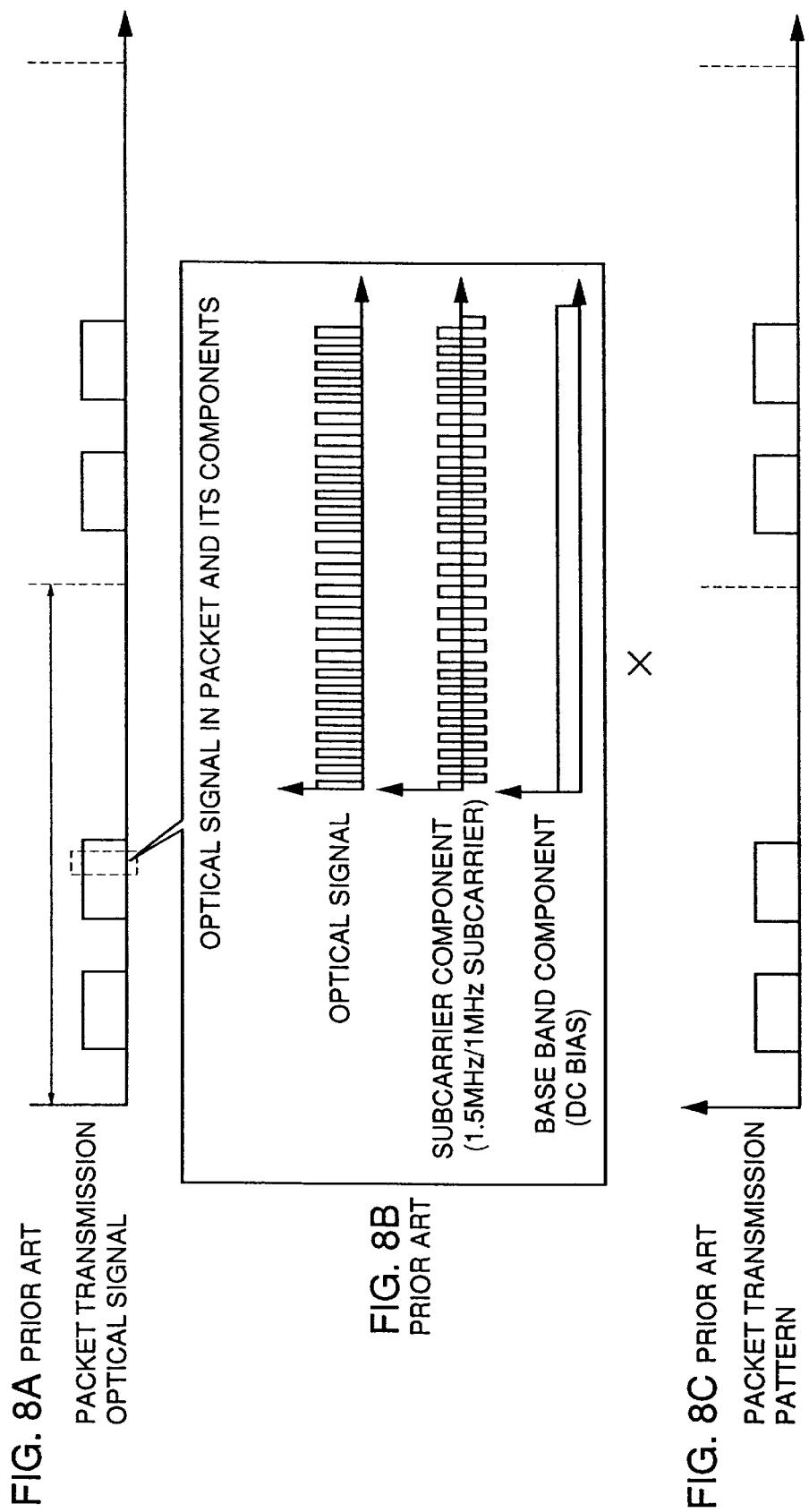
FIG. 8A PRIOR ART PACKET TRANSMISSION OPTICAL SIGNAL
FIG. 8B PRIOR ART OPTICAL SIGNAL IN PACKET AND ITS COMPONENTS
- OPTICAL SIGNAL
- SUBCARRIER COMPONENT (1.5MHz/1MHz SUBCARRIER)
- BASE BAND COMPONENT (DC BIAS)
FIG. 8C PRIOR ART PACKET TRANSMISSION PATTERN

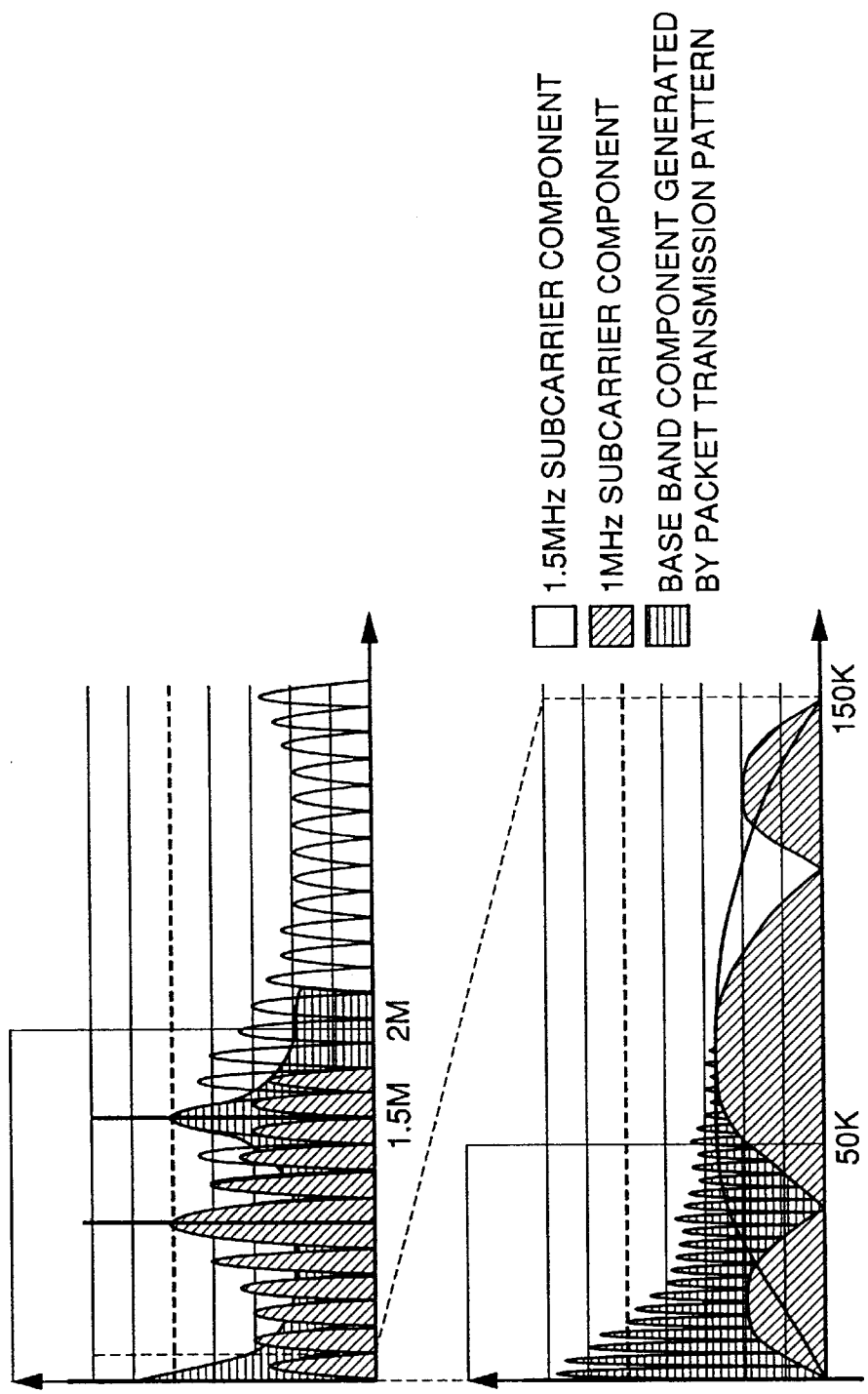

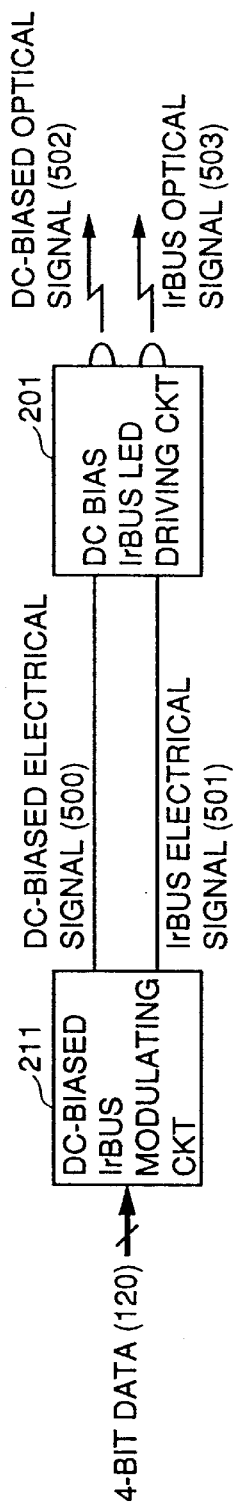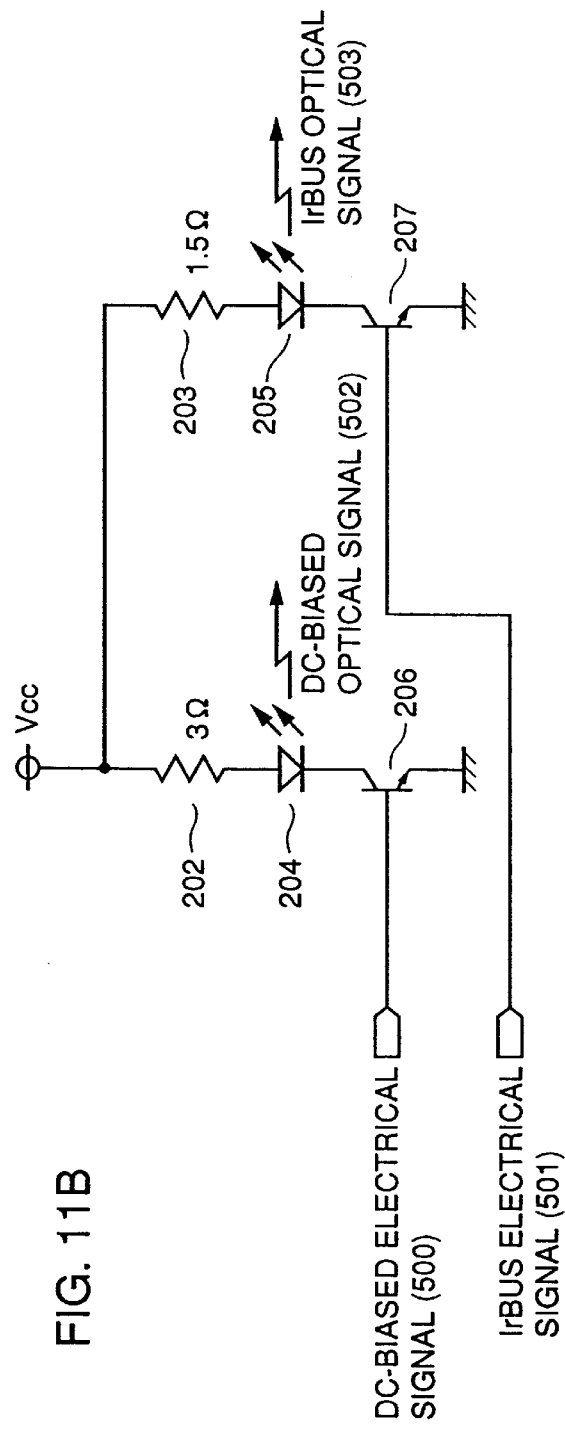
FIG. 11A
FIG. 11B

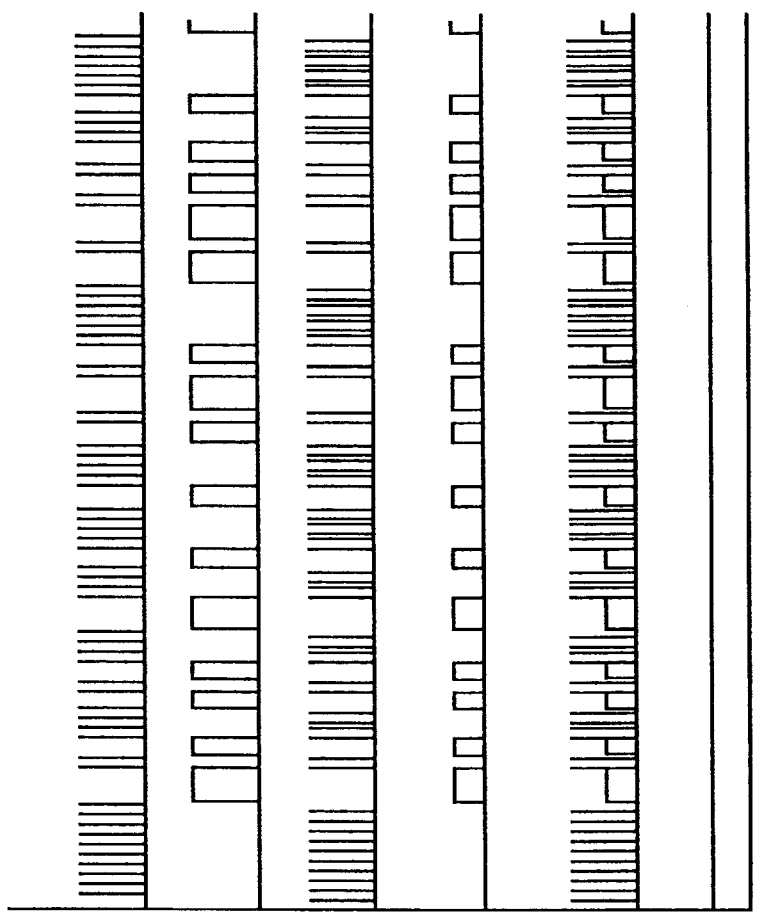
FIG. 12A  IrBUS ELECTRICAL SIGNAL (501)
FIG. 12B  DC-BIASED SIGNAL (500)
FIG. 12C  IrBUS OPTICAL SIGNAL (503)
FIG. 12D  DC-BIASED OPTICAL SIGNAL (502)
FIG. 12E  WAVEFORM INPUT TO OPTICAL RECEIVER
FIG. 12F  OPTICAL SIGNAL BASE BAND COMPONENT

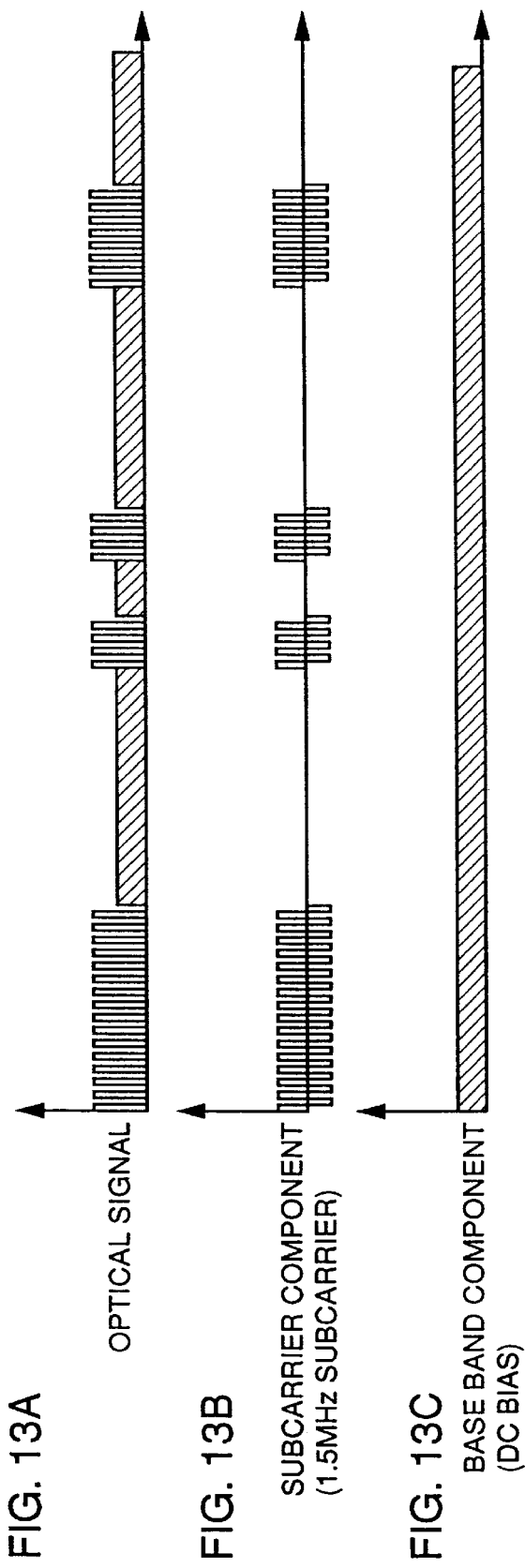

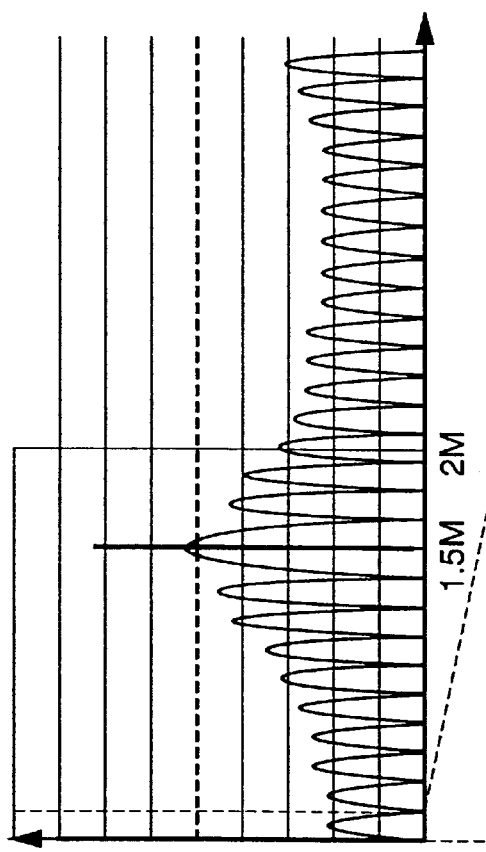
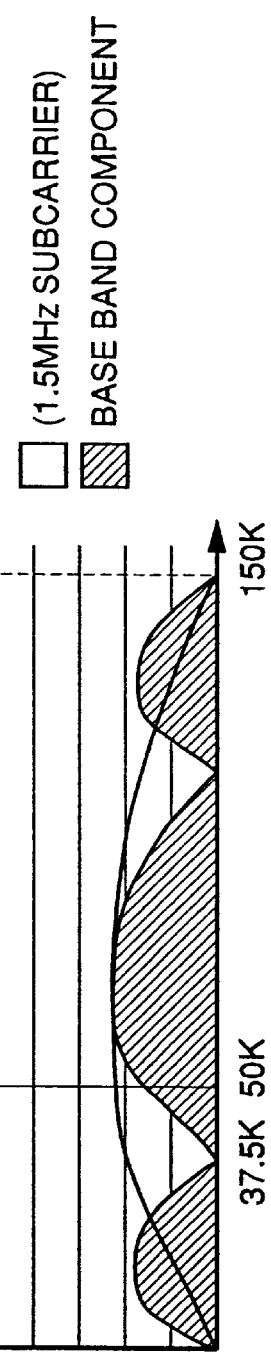
FIG. 15A
FIG. 15B

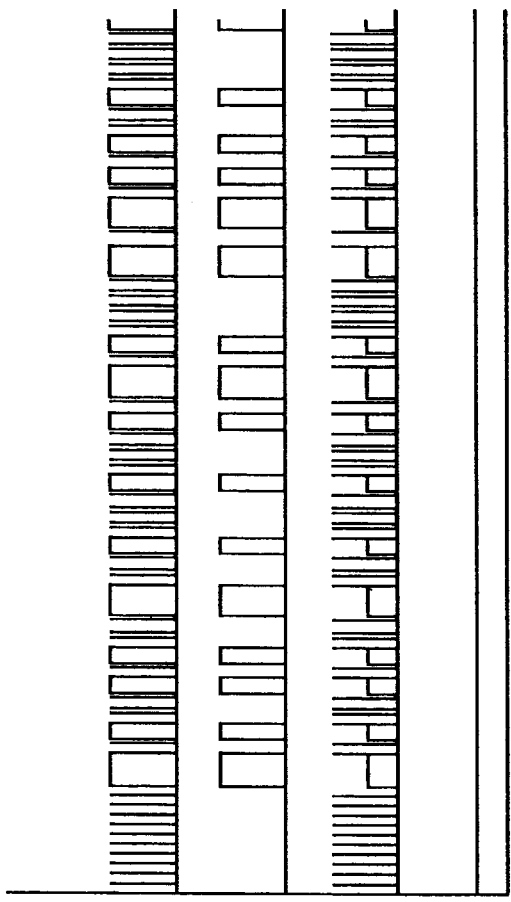
FIG. 17A DC BIASED IrBUS ELECTRICAL SIGNAL (601)
FIG. 17B LED CURRENT LIMITING RESISTOR CONTROL SIGNAL (600)
FIG. 17C DC BIASED IrBUS OPTICAL SIGNAL (602)
FIG. 17D OPTICAL SIGNAL BASE BAND COMPONENT FIG. 19A BASE BAND SIGNAL (17)
FIG. 19B SUBCARRIER A (18)
FIG. 19C ASK SIGNAL (21)
FIG. 19D THE INVERSE OUTPUT OF BASE BAND SIGNAL (17)
FIG. 19E PACKET ENABLE SIGNAL (19)
FIG. 19F SUBCARRIER B (20)
FIG. 19G FSK-BIASED COMPONENT (22)
FIG. 19H FSK-BIASED ASK SIGNAL (23)

FIG. 22
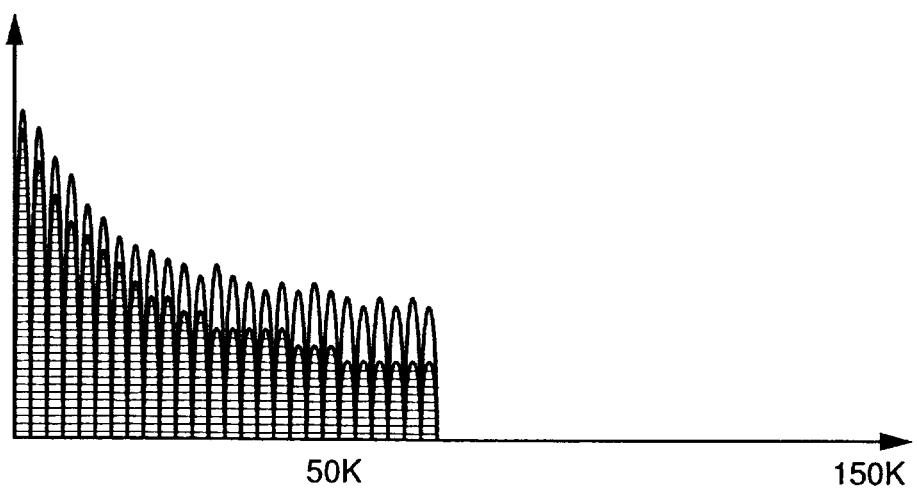
 a. POWER SPECTRUM GENERATED BY CONVENTIONAL PACKET TRANSMISSION
 b. POWER SPECTRUM GENERATED BY PACKET TRANSMISSION ACCORDING TO THE INVENTION

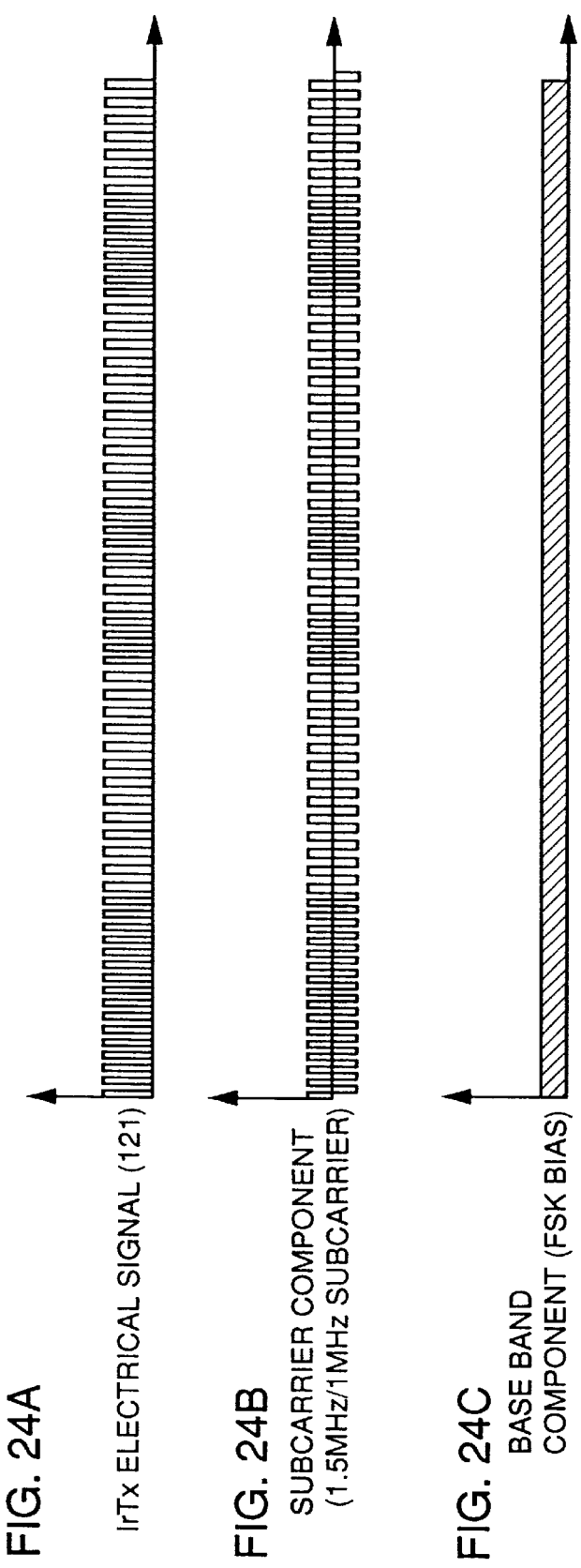

DIGITAL OPTICAL TRANSMISSION APPARATUS AND METHOD FOR PERFORMING ASK MODULATION TO GENERATE BASE BAND COMPONENT WITH CONSTANT DC LEVEL

BACKGROUND OF THE INVENTION

1. Field of the Invention

The present invention relates generally to digital optical communication used for electric home appliances or information equipment having an infrared communication function, and more particularly, to a digital optical transmission apparatus and a method for performing ASK modulation to alleviate mutual interferences.

2. Description of the Background Art

In optical communication in general, the amplitude, phase or frequency of a subcarrier is usually changed for transmission depending upon data desired to be communicated. This is called carrier bank modulation as compared to modulation not utilizing a subcarrier (base band modulation). The subcarrier is created artificially by turning on/off light in a certain cycle. The subcarrier is often replaced with a square wave of light simply turned on/off.

Among carrier band modulation techniques, the simplest technique changes the amplitude. The technique is called ASK (amplitude-shift keying). Among various ASK techniques, the simplest one utilizes two kinds of amplitudes, a prescribed amplitude and an amplitude zero. The technique is more particularly called OOK (on/off keying).

A signal modulated according to base band modulation techniques such as RZ (Return to Zero) modulation, PPM (Pulse Position Modulation) and Manchester modulation may be superposed by a subcarrier for transmission. These modulation techniques are also ASK modulation techniques in a board sense. The waveforms according to these modulation techniques are given in FIG. 1. The modulation technique which changes the phase and frequency of a subcarrier are called PSK (Phase Shift Keying) modulation and FSK (Frequency Shift Keying) modulation, respectively. A waveform produced by PSK modulation and a waveform produced by FSK modulation are shown in FIG. 2.

Spectrum According to Conventional Carrier Band Modulation

A spectrum according to carrier band modulation has a main lobe in a frequency band around the frequency of the subcarrier. According to a technique using a plurality of subcarriers such as FSK, there are a plurality of main lobes in frequency bands around the frequencies of the subcarriers. One of the side bands of a main lobe according to a carrier band modulation technique is the inverse of the minimum "subcarrier unchanged time" normally used according to the modulation technique.

Spectrum According to Conventional Carrier Band Modulation Technique, Particularly ASK Modulation Technique A spectrum according to an ASK modulation technique produced by superposing a waveform according to a base band modulation technique by a subcarrier corresponds to a spectrum produced by shifting the original spectrum according to a base band modulation technique to a frequency band around the frequency of the subcarrier. Note, however, the entire spectrum according to the base band modulation is not shifted to a high frequency band, and a part of the spectrum according to the base band modulation remains in the low frequency band as unwanted radiation. A spectrum according to an ASK modulation technique produced by superposing the waveform of an NRZ (Non Return to Zero) modulation technique by a subcarrier is given in FIG. 3.

Spectra According to Conventional Carrier Band Modulation Technique, Particularly According to PSK and FSK Modulation Techniques According to PSK and FSK modulation, unlike the ASK modulation technique, no spectrum appears in a low frequency band. According to these techniques, however, more power is generally consumed than the ASK modulation and the circuit configuration of a receiver for the modulation technique is more complicated. As a result, ASK modulation techniques or base band modulation techniques are more often used in the optical communication industry.

As described above, according to the base band and ASK modulation techniques, a spectrum having a main lobe of a bandwidth of at least a bit rate appears in a low frequency band. Therefore, if there are transmitter/receivers according to a plurality of communication techniques, disadvantageous mutual interferences are caused among these transmitter/receivers.

A remote control used for a television, for example, employs an ASK communication technique at a bit rate of 1 Kbps using a subcarrier in the vicinity of 40 KHz. The spectrum has a main lobe of about 2 KHz around the vicinity of 40 KHz on one side. Herein, if a communication at about 75 Kbps is newly performed according to another communication method, a spectrum appears in a low frequency band about in the range from 0 Hz to 75 KHz whether the base band modulation or ASK modulation technique is employed. Therefore, optical communication using the remote control will be interfered with. Thus, while having a communication at about 75 Kbps according to the conventional base band modulation or ASK modulation technique, the interference between that communication and the remote control using a subcarrier at about 40 KHz has been hardly eliminated.

Spectrum According to IrBUS Method as Related Art

In order to solve the above problem, a 16 PSM (Pulse Sequence Modulation) coding method has been proposed in the IrBUS method that the United States Infrared Data Association (IrDA) is presently trying to standardize as a coding method to replace conventional base band modulation techniques. In the proposed coding method, as shown in Table 1, 4-bit data is allocated to 16 symbols represented by 8 slots.

TABLE 1

| Transmission Data | | | | Parallel Symbol Pattern | | | | | | | |
|---|---|---|---|---|---|---|---|---|---|---|---|
| D3 | D2 | D1 | D0 | P7 | P6 | P5 | P4 | P3 | P2 | P1 | P0 |
| 0 | 0 | 0 | 0 | 1 | 0 | 1 | 0 | 0 | 0 | 0 | 0 |
| 0 | 0 | 0 | 1 | 0 | 1 | 0 | 1 | 0 | 0 | 0 | 0 |
| 0 | 0 | 1 | 0 | 0 | 0 | 1 | 0 | 1 | 0 | 0 | 0 |
| 0 | 0 | 1 | 1 | 0 | 0 | 0 | 1 | 0 | 1 | 0 | 0 |
| 0 | 1 | 0 | 0 | 0 | 0 | 0 | 0 | 1 | 0 | 1 | 0 |
| 0 | 1 | 0 | 1 | 0 | 0 | 0 | 0 | 0 | 1 | 0 | 1 |
| 0 | 1 | 1 | 0 | 1 | 0 | 0 | 0 | 0 | 0 | 1 | 0 |
| 0 | 1 | 1 | 1 | 0 | 1 | 0 | 0 | 0 | 0 | 0 | 1 |
| 1 | 0 | 0 | 0 | 1 | 1 | 1 | 1 | 0 | 0 | 0 | 0 |
| 1 | 0 | 0 | 1 | 0 | 1 | 1 | 1 | 1 | 0 | 0 | 0 |
| 1 | 0 | 1 | 0 | 0 | 0 | 1 | 1 | 1 | 1 | 0 | 0 |
| 1 | 0 | 1 | 1 | 0 | 0 | 0 | 1 | 1 | 1 | 1 | 0 |

TABLE 1-continued

| Transmission Data | | | | Parallel Symbol Pattern | | | | | | | |
|---|---|---|---|---|---|---|---|---|---|---|---|
| D3 | D2 | D1 | D0 | P7 | P6 | P5 | P4 | P3 | P2 | P1 | P0 |
| 1 | 1 | 0 | 0 | 0 | 0 | 0 | 0 | 1 | 1 | 1 | 1 |
| 1 | 1 | 0 | 1 | 1 | 0 | 0 | 0 | 0 | 1 | 1 | 1 |
| 1 | 1 | 1 | 0 | 1 | 1 | 0 | 0 | 0 | 0 | 1 | 1 |

In the IrBUS method, this 16 PSM base band signal is superposed by a subcarrier at 1.5 MHz to produce a power spectrum valley in the range 36 KHz to 40 KHz, a peak power spectrum band for a subcarrier normally used by a remote control for electric home appliances, such that mutual interference is alleviated. The use of this method may restrain mutual interferences to about ½ the level of the conventional base band or ASK modulation method.

FIGS. 4A to 4C show an optical signal produced by superposing a 16 PSM base band signal by a subcarrier, its subcarrier component and its base band component (details of which will be described later), respectively.

FIGS. 5A and 5B show a conventional LED driving circuit. The LED driving circuit shown in FIGS. 5A and 5B includes an LED current limiting resistor 105, a transistor 107 having its output controlled by an IrTx electrical signal 800, and an LED 106 which emits light when transistor 107 is turned on and outputs an IrTx optical signal 801. Note that the LED driving circuit shown FIG. 5A has LED current limiting resistor 105 between a power supply 104 and LED 106, and transistor 107 has its collector and emitter connected to LED 106 and ground, respectively. The LED driving circuit shown in FIG. 5B has LED 106 between power supply 104 and LED current limiting resistor 105, and transistor 107 has its collector and emitter connected to LED current limiting resistor 105 and ground, respectively.

When IrTx electrical signal 800 attains a high level, transistor 108 is turned on, which allows a current to be passed to LED 106 through LED current limiting resistor 105, and LED 106 emits light which is output as IrTx optical signal 801. When IrTx electrical signal 800 attains a low level, transistor 107 is turned off, so that no current is passed to LED 106, which therefore does not emit light.

FIGS. 6A and 6B show a power spectrum in the range from 0 to 2 MHz and a power spectrum in the range from 0 to 50 KHz, respectively when a 16 PSM base band signal superposed by a subcarrier is transmitted.

FIGS. 7A and 7B show power spectra shown in FIGS. 6A and 6B which are divided into its subcarrier component and base band component, respectively.

The component forming an optical signal waveform according to the IrBUS method and a power spectrum generated by the component will be now described.

A subcarrier in the case of an electric wave is an AC component having an amplitude in positive and negative directions around 0 V. In the case of an optical signal, however, a subcarrier is artificially generated by turning on/off light unlike the case of the electric wave, and therefore the subcarrier has an amplitude only in the positive direction. A subcarrier for an optical signal having such an amplitude A may be regarded as a signal produced by combining a DC current having an amplitude of A/2 and a sine wave (or a square wave) having an amplitude of A/2. Herein, the former is defined as the DC component of the subcarrier and the latter as the subcarrier component.

A carrier band-modulated optical signal may be divided into a DC component and a subcarrier component on the basis of a symbol defined according to the modulation method. Herein, a waveform produced by combining in time series the subcarrier components of subcarrier symbols included in the entire optical signal is defined as the subcarrier component of the optical signal. Similarly, a waveform produced by combining in time series the DC component of each of the subcarrier symbols included in the entire optical signal is defined as the base band component of the optical signal.

More specifically, when the bias levels of the DC components of the subcarrier symbols are all equal, the condition is expressed as "the DC component of the base band component of the optical signal is constant".

When the waveform according to the IrBUS method shown in FIG. 4A is analyzed for the above-described component, the waveform may be divided into the subcarrier component at 1.5 MHz and the base band component as shown in FIGS. 4B and 4C, respectively. Power spectra generated by the subcarrier component at 1.5 MHz and the base band component are as shown in FIGS. 6A and 6B, respectively.

The base band component shown in FIG. 4C is a base band signal according to the 16 PSM coding method before superposing the subcarrier, and the spectrum of the signal component will be unwanted radiation remaining in the low frequency band as described above.

In the 16 PSM coding method, such unwanted radiation in the central frequency band used by a remote control is restrained. However, the light receiving element of the remote control has a very high sensitivity and has a certain degree of sensitivity to a frequency apart from the central frequency. As a result, disadvantageous interference with the remote control cannot be completely solved even according to the 16 PSM coding method. The IrBUS method is a kind of ASK modulation, and the disadvantage is encountered as long as the conventional of ASK modulated signal is used.

Meanwhile, according to the FSK or PSK modulation method in which a subcarrier continues to be transmitted, the DC level of the base band component is constant, and therefore the above-described disadvantage is not observed. However, in optical communications in practice, data is divided into predetermined amounts and formed into packets for communication. For example, a plurality of such packets are communicated at a cycle of 13.8 ms according to the IrBUS method.

FIG. 8A is a waveform chart showing a waveform when packets according to the FSK modulation method using a 1.5 MHz subcarrier and a 1 MHz subcarrier are transmitted through packet-communication in which the two packets are transmitted at a cycle of 13.8 ms as is the case with the IrBUS method. As shown in FIGS. 8B and 8C, when the waveform at the time of receiving the packet is analyzed, the waveform may be divided into 1.5 MHz/1 MHz subcarrier component, a base band component and a pattern in which the packet is transmitted. Herein, the base band component generated as the result of superposing the base band component by the packet transmission pattern is called "a packet transmission base band component". FIGS. 9A and 9B show power spectra at 0 to 2 MHz and 0 to 50 MHz when a packet modulated according to the FSK modulation method is transmitted. FIGS. 10A and 10B show the subcarrier components and the base band components divided from the power spectra shown in FIGS. 9A and 9B, respectively.

As is the case with the continuously output FSK signal, the power spectrum of a packet communication base band component ranges to the low frequency region rather than concentrating only on the DC portion. The sub lobe interferes with the main lobe of the remote control, which significantly lowers the communication efficiency. The sub lobe, which depends on the transmission pattern in the packet communication, is necessarily generated regardless of the modulation method employed as long as a packet communication is performed.

SUMMARY OF THE INVENTION

It is an object of the present invention to provide an optical transmission apparatus capable of alleviating mutual interferences with an existing optical transmission apparatus, without having to change an existing optical receiving apparatus.

Another object of the present invention is to provide an optical transmission method which permits mutual interferences with an existing optical transmission apparatus to be alleviated, without having to change an existing optical receiving apparatus.

A digital optical transmission apparatus according to one aspect of the present invention includes a modulation portion which modulates data to be transmitted in an ASK modulation method, and an E/O conversion portion which converts an electrical signal output from the modulation portion into an optical signal having a constant DC level in its base band component.

The E/O conversion portion converts an electrical signal output from the modulation portion into an optical signal having a constant DC level in its base band component, and therefore the power spectrum of the base band component may be reduced, which may reduce mutual interferences with an existing optical transmission apparatus. Since a DC-biased signal or an FSK-biased signal is ignored by an existing optical receiving apparatus, the optical receiving apparatus does not need any change.

A digital optical transmission apparatus according to another aspect of the present invention includes a modulation portion which modulates a packet to be transmitted, a redundancy signal generation portion which attaches a redundancy signal at the start of a packet to be output from the modulation portion for a prescribed time period, and an E/O conversion circuit which gradually increases the power supply voltage and converting an electrical signal output from the modulation portion into an optical signal based on the increased power supply voltage within the time period in which the redundancy signal attached by the redundancy signal generation portion is output.

The E/O conversion circuit gradually increases the power supply voltage within the time period in which the redundancy signal attached by the redundancy signal generation portion is output, and converts an electrical signal output from the modulation portion into an optical signal based on the increased power supply voltage, and therefore the density of the high frequency component of the power spectrum generated by the base band component may be reduced, so that mutual interferences with an existing optical transmission apparatus may be alleviated. Since the redundancy signal is ignored by an existing optical receiving apparatus, the optical receiving apparatus does not need any change.

A digital optical transmission apparatus according to another aspect of the present invention include a modulation portion which modulates a packet to be transmitted, a redundancy signal generation portion which attaches a redundancy signal at the end of a packet to be output from the modulation portion for a prescribed time period, and an E/O conversion circuit which gradually reduces the power supply voltage within a time period in which the redundancy signal attached by the redundancy signal generation portion is output and converts an electrical signal output from the modulation portion based on the reduced power supply-voltage into an optical signal.

The E/O conversion circuit gradually reduces the power supply voltage within a time period in which the redundancy signal attached by the redundancy signal generation portion is output and converts an electrical signal output from the modulation portion into an optical signal based on the reduced power supply voltage; and therefore the density of the high frequency component of the power spectrum generated by the base band component may be reduced, so that mutual interferences with an existing optical transmission apparatus may be alleviated. The redundancy signal is ignored by an existing optical receiving apparatus, and therefore the optical receiving apparatus does not need any change.

A digital optical transmission method according to yet another aspect of the present invention includes the steps of modulating data to be transmitted in an ASK modulation method, and converting the modulated electrical signal into an optical signal having a constant DC level in its base band component.

Since the modulated electrical signal is converted into an optical signal having a constant DC level in its base band component, the power spectrum of the base band component may be reduced, so that mutual interferences with an existing optical transmission apparatus may be alleviated. Since a DC-biased signal or an FSK-biased signal is ignored by an existing optical receiving apparatus, the optical receiving apparatus does not need any change.

A digital optical transmission method according to a still further aspect of the present invention includes the steps of modulating a packet to be transmitted, attaching a redundancy signal at the start of the modulated packet for a prescribed time period, and gradually increasing the power supply voltage within the time period of the attached redundancy signal, thereby converting the modulated electrical signal into an optical signal based on the power supply voltage.

Since the power supply voltage is gradually increased within the time period in which the attached redundancy signal output, and the modulated electrical signal is converted into an optical signal based on the power supply voltage, the density of the high frequency component of the power spectrum generated by the base band component may be reduced, so that mutual interference with an existing optical transmission apparatus may be alleviated. Since the redundancy signal is ignored by an existing optical receiving apparatus, the optical receiving apparatus does not need any change.

A digital optical transmission method according to an additional aspect of the present invention includes the steps of modulating a packet to be transmitted, attaching a redundancy signal at the end of the modulated packet for a prescribed time period, and gradually reducing the power supply voltage within the time period of the attached redundancy signal, and converting the modulated electrical signal into an optical signal based on the power supply voltage.

Since the power supply voltage is gradually reduced within the time period in which the attached redundancy signal is output, and the modulated electrical signal is converted into an optical signal based on the power supply voltage, the density of the high frequency component of the power spectrum generated by the base band component may be reduced, so that mutual interferences with an existing optical transmission apparatus may be alleviated. The redundancy signal is ignored by an existing optical receiving apparatus, and therefore the optical receiving apparatus does not need any change.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4C are waveform charts showing an optical signal modulated by a conventional ASK modulation method, its subcarrier component and a base band component, respectively;

FIGS. 7A and 7B are charts showing the power spectra in FIGS. 6A and 6B which are each divided into a subcarrier component and a base band component;

FIGS. 8A to 8C are graphs showing a waveform modulated by a conventional FSK modulation method, its subcarrier component and its base band component, respectively;

FIGS. 10A and 10B are graphs showing the power spectra in FIGS. 9A and 9B which are each divided into a subcarrier component and a base band component;

FIG. 11A is a block diagram showing the general configuration of an optical transmission apparatus according to a first embodiment of the present invention;

FIG. 11B is a diagram showing the configuration of an LED driving circuit 201 for DC-biased IrBUS;

FIGS. 12A to 12F are timing charts of signals for the optical transmission apparatus according to the first embodiment;

FIGS. 13A to 13C are charts showing an optical signal output from the optical transmission apparatus according to the first embodiment, its subcarrier component and its base band component, respectively;

FIGS. 15A and 15B are graphs showing the power spectra in FIGS. 14A and 14B which are each divided into a subcarrier component and a base band component;

FIGS. 17A to 17D are timing charts of signals for the optical transmission apparatus according to the second embodiment;

FIG. 22 is a chart showing in comparison a power spectrum generated by a packet transmission in the optical transmission apparatus according to the fourth embodiment and a power spectrum generated by a conventional packet transmission;

FIGS. 24A to 24C are charts showing an FSK-biased signal output from the optical transmission apparatus according to the fifth embodiment, its subcarrier component and its base band component;

DESCRIPTION OF THE PREFERRED EMBODIMENTS

First Embodiment

Figure 1:
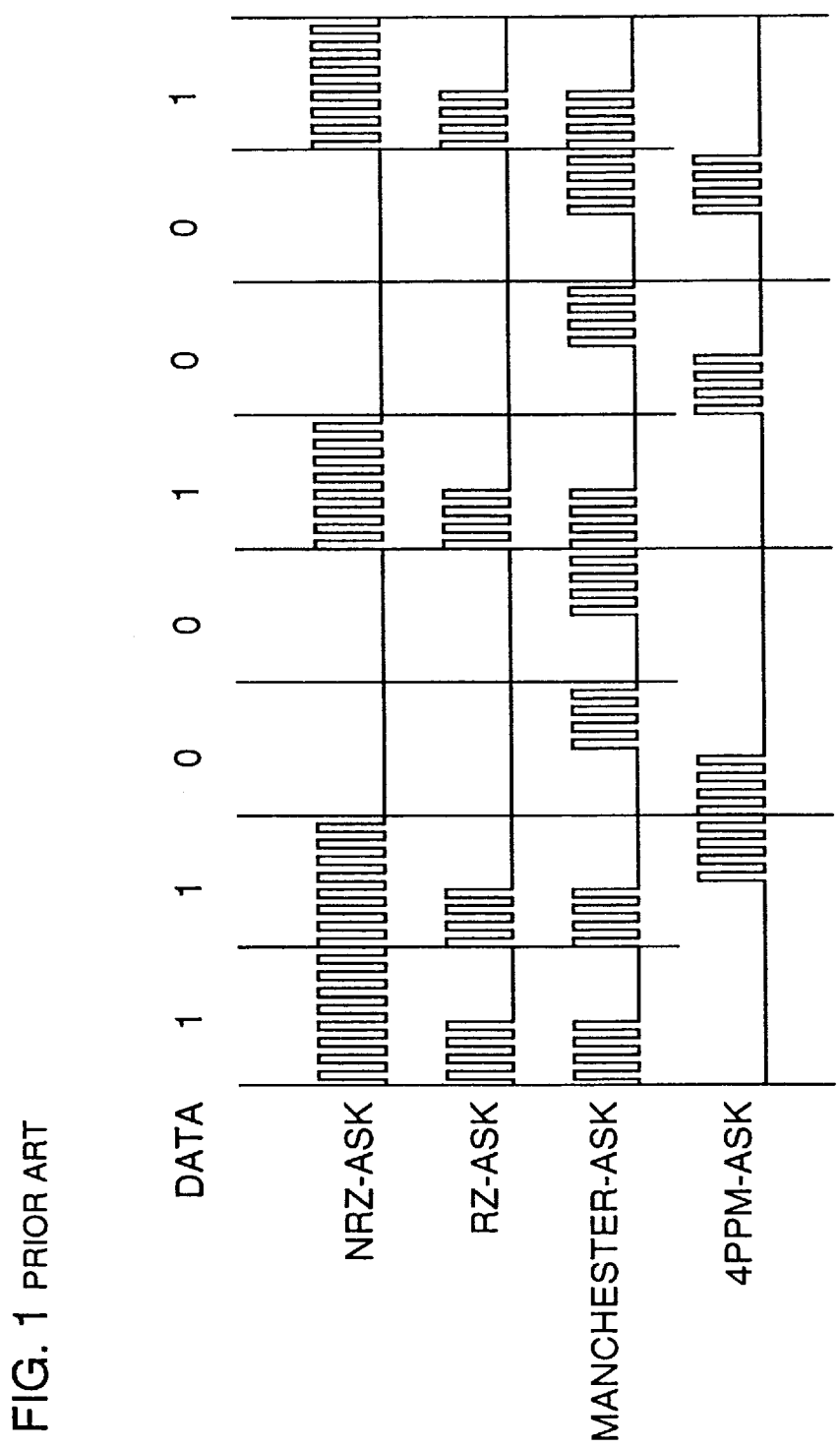
FIG. 1 is a waveform chart for use in illustration of waveforms modulated by a conventional ASK modulation method.
Figure 2:
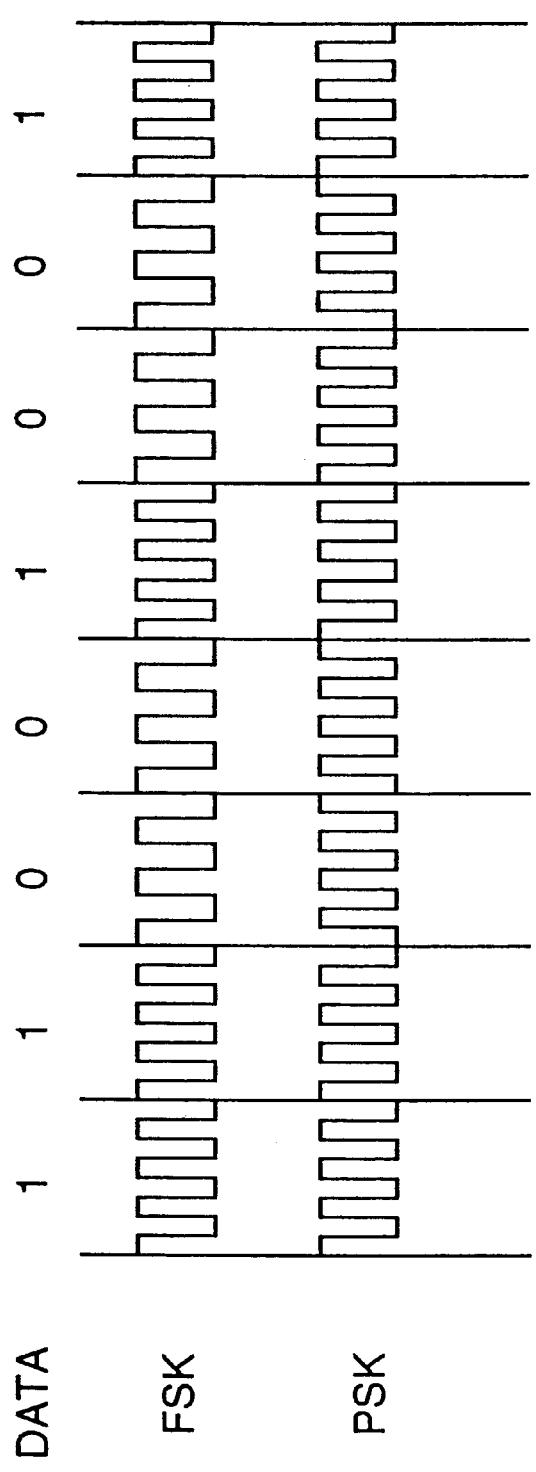
FIG. 2 is a waveform chart for use in illustration of waveforms modulated by conventional FSK and PSK modulation methods.
Figure 3:
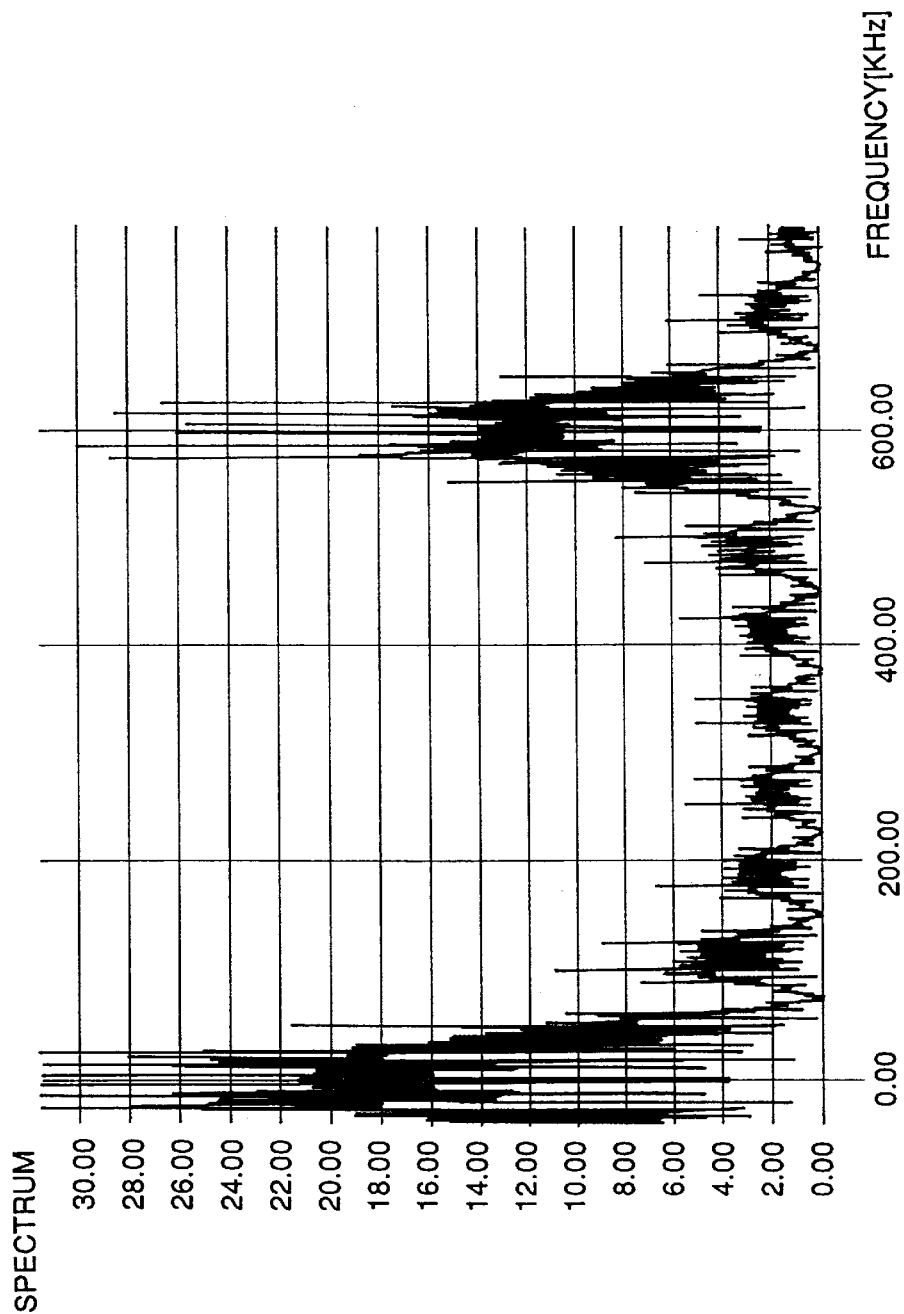
FIG. 3 is a graph showing the power spectrum of a waveform modulated by a conventional ASK modulation method.

Among optical communication methods which employs ASK modulation, a method to transmit a DC component having an amplitude half the amplitude of a main signal in a subcarrier in the part to which the subcarrier optical signal is not output will be referred to as "DC bias".

Referring to FIG. 11A, an optical transmission apparatus according to a first embodiment of the present invention includes a DC-biased IrBUS modulation circuit 211 which modulates 4-bit data 120 in an IrBUS method into an IrBUS electrical signal 501 and generates a DC-biased electrical signal 500, and a DC-bias IrBUS LED driving circuit 201 which converts DC-biased electrical signal 500 and IrBUS electrical signal 501 into optical signals.

Referring to FIG. 11B, DC-bias IrBUS LED driving circuit 201 includes two LED driving circuits. One is an LED driving circuit to optically convert IrBUS electrical signal 501, and the other is an LED driving circuit which optically converts DC-biased electrical signal 500. DC-bias IrBUS LED driving circuit 201 includes LED current limiting resistors 202 and 203, a transistor 206 which has its output controlled by DC-biased electrical signal 500, a transistor 207 which has its output controlled by IrBUS electrical signal 501, an LED 204 which emits light when transistor 206 is turned on to output a DC-biased optical signal 502, and an LED 205 which emits light when transistor 207 is turned on to output an IrBUS optical signal 503. LEDs 204 and 205 and transistors 206 and 207 used in the LED driving circuit have the same electrical characteristics. LED current limiting resistors 202 and 203 each have one terminal connected to a power supply voltage Vcc. LED current limiting resistors 202 and 203 have the other terminals connected to LEDs 204 and 205, respectively. Transistors 206 and 207 have their collectors connected to LEDs 206 and 207, respectively and their emitters connected to ground.

The value of LED current limiting resistor 202 in the LED driving circuit provided with DC-biased electrical signal 500 is adjusted to be twice the value of LED current limiting resistor 203 in the LED driving circuit provided with IrBUS electrical signal 501. Therefore, a current passed through LED 204 in the LED driving circuit provided with DC-biased electrical signal 500 is about ½ the current passed through LED 205 in the LED driving circuit provided with IrBUS electrical signal 501. As a result, as shown in FIGS. 12C and 12D, an IrBUS optical signal 503 is output with an amplitude twice the amplitude of DC-biased optical signal 502.

Signals generated by the optical transmission apparatus shown in FIG. 11A are given in FIGS. 12A to 12D. FIG. 12E shows the waveform of an optical signal input to an optical receiver and FIG. 12F shows the base band component of the optical signal.

Figure 14A:
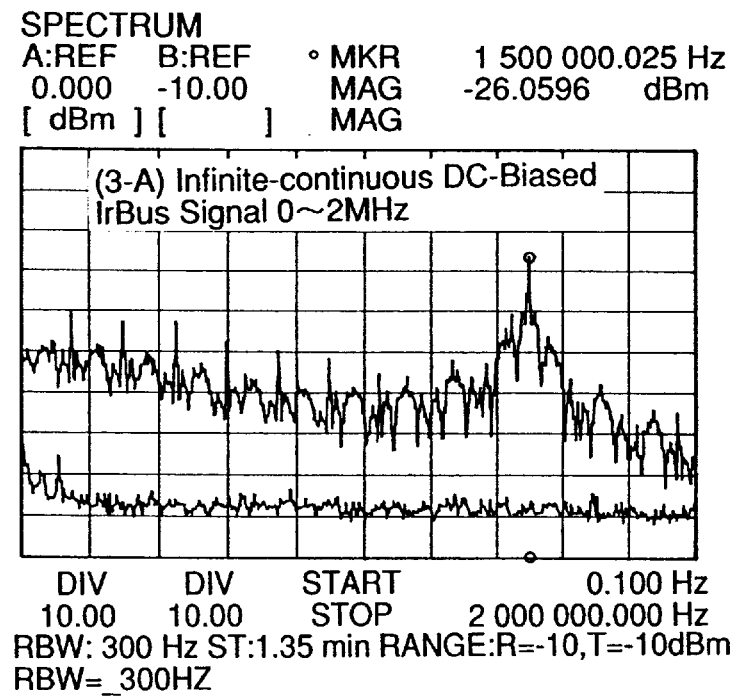
FIGS. 14A and 14B are graphs each showing the power spectrum of an optical signal output from the optical transmission apparatus according to the first embodiment.
Figure 14B:
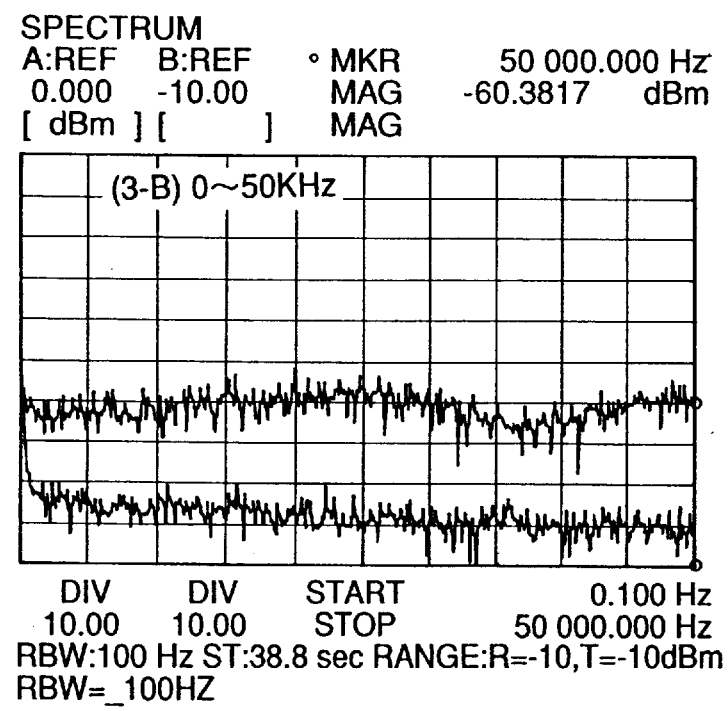

FIGS. 13A to 13C show an optical signal transmitted from the optical transmission apparatus according to the first embodiment, its subcarrier component and its base band component. FIGS. 14A and 14B show the power spectrum in the range from 0 to 2 MHz and the power spectrum in the range from 0 to 50 KHz when an optical signal is transmitted from the optical transmission apparatus according to the first embodiment. FIGS. 15A and 15B are charts showing the power spectra in FIGS. 14A and 14B which are divided into a subcarrier component and a base band component. As can be seen from these figures, an optical signal transmitted from the optical transmission apparatus according to the first embodiment has a base band component reduced as compared to that of the optical signal transmitted from the conventional transmission apparatus as shown in FIGS. 7A and 7B.

As described above, in the optical transmission apparatus according to the first embodiment, the power spectrum of the base band component may be reduced, so that mutual interferences with an existing optical transmission apparatus may be reduced. Since the DC-biased signal is ignored by an existing optical receiving apparatus, the optical receiving apparatus does not need any change.

Second Embodiment

Figure 16A:
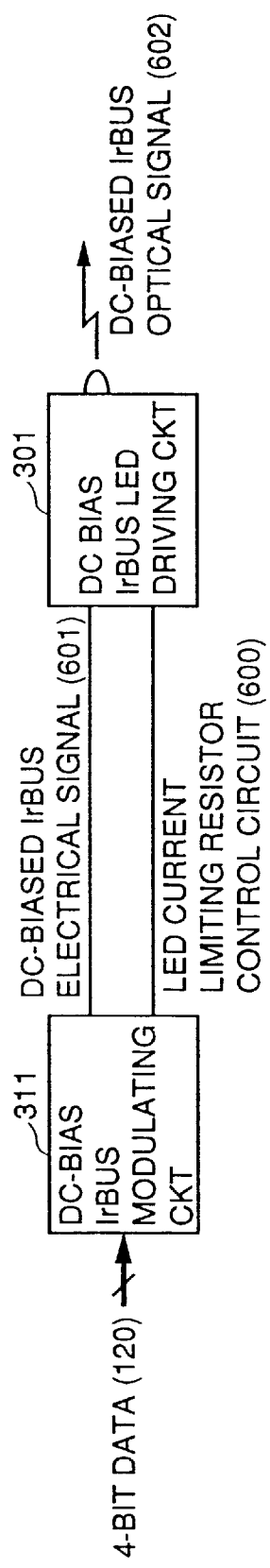
FIG. 16A is a block diagram showing the general configuration of an optical transmission apparatus according to a second embodiment of the present invention.

Referring to FIG. 16A, an optical transmission apparatus according to a second embodiment of the present invention includes a DC bias IrBUS modulation circuit 311 which generates a DC-biased IrBUS electrical signal 601 and an LED current limiting resistor control signal 600, an LED driving circuit 301 for DC-biased IrBUS which generates and outputs an optical signal from LED current limiting resistor control signal 600 and DC-biased IrBUS electrical signal 601. LED current limiting resistor control signal 600 attains a high level when a subcarrier is not output. DC-biased IrBUS electrical signal 601 is produced by modulating 4-bit data 120 in the IrBUS modulation method and attains a high level in the range in which a subcarrier is not output.

Figure 16B:
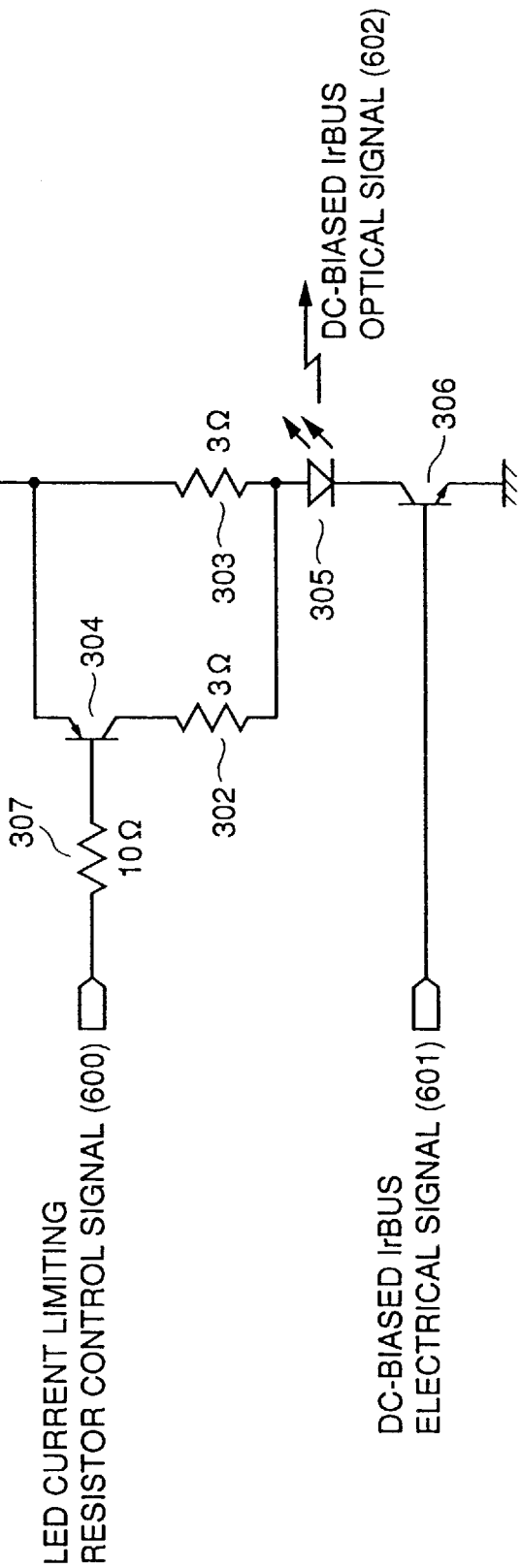
FIG. 16B is a diagram showing the configuration of an LED driving circuit 301 for DC-biased IrBUS.

Referring to FIG. 16B, LED driving circuit 301 for DC-biased IrBUS includes LED current limiting resistors 302 and 303, a transistor 304 controlled by LED current limiting resistor control signal 600, a transistor 306 controlled by DC-biased IrBUS electrical signal 601, an LED 305 which emits lights when transistor 306 is turned on, and a resistor 307.

LED current limiting resistor control signal 600 is input to the base of transistor 304 through resistor 307 (10Ω). Transistor 304 has its emitter connected to Vcc and its collector connected to one terminal of LED current limiting resistor 302. The other terminal of LED current limiting resistor 302 is connected to LED 305. Transistor 306 has its collector connected to LED 305 and its emitter connected to ground.

When a subcarrier is output to DC-biased IrBUS electrical signal 601, transistor 304 is turned off, and therefore a current is supplied to LED 305 only through LED current limiting resistor 303. When a subcarrier is not output to DC-biased IrBUS electrical signal 601, transistor 304 is turned on, and therefore a current is supplied to LED 305 through LED current limiting resistors 302 and 303. The current passed through LED 305 when the subcarrier component is output is twice as much as that passed through LED 305 when the DC-biased component is output. As a result, the optical amplitude of the subcarrier component is twice the optical amplitude of the DC-biased component. FIGS. 17A to 17D show DC-biased IrBUS electrical signal 601, LED current limiting resistor control signal 600, DC-biased IrBUS optical signal 602 output from LED 305 and the base band component of the optical signal, respectively.

As described above, in the optical transmission apparatus according to the second embodiment, the power spectrum of the base band component may reduced as is the case with the optical transmission apparatus according to the first embodiment, so that mutual interferences with existing optical transmission apparatuses may be alleviated. The DC-biased signal is ignored by an existing optical receiving apparatus, the optical receiving apparatus does not need any change.

Third Embodiment

Among optical transmission methods which employ ASK modulation, a method which transmits a subcarrier having a frequency different from that of a subcarrier used in a main signal in a range in which a subcarrier optical signal is not output will be hereinafter referred to as "FSK bias".

Figure 18:
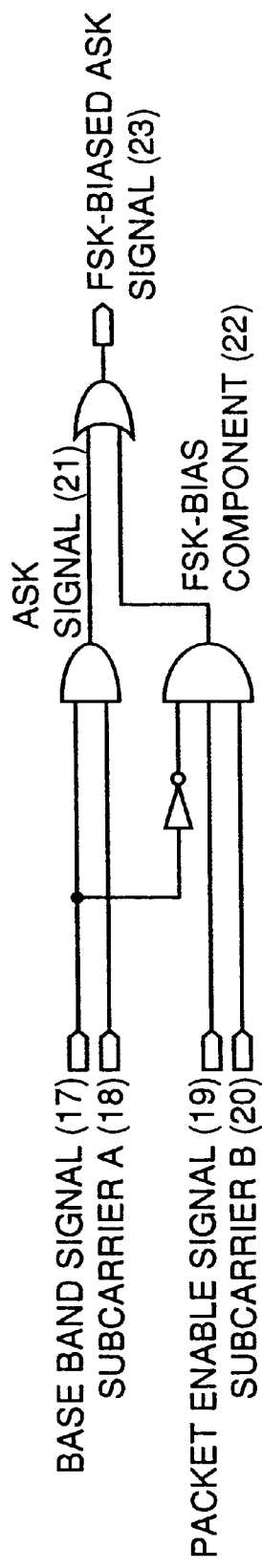
FIG. 18 is a diagram showing a logic circuit which generates an FSK-biased ASK signal in an optical transmission apparatus according to a third embodiment of the present invention.
Figure 19:
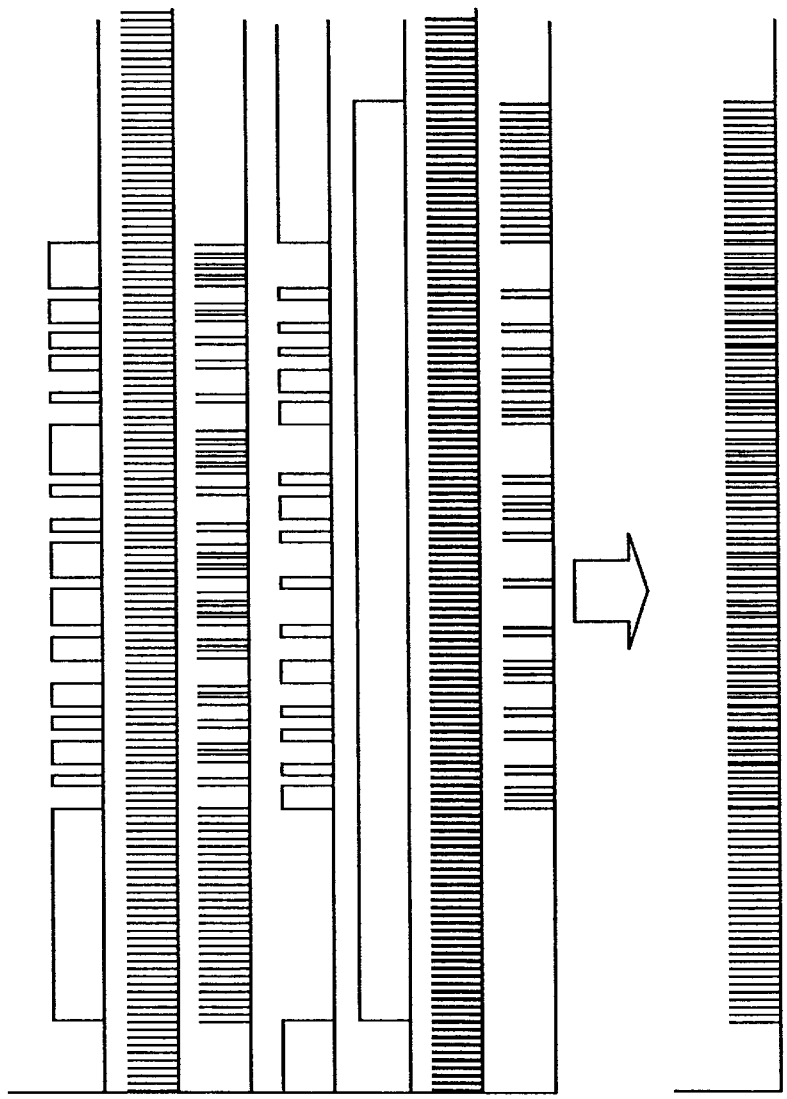
FIGS. 19A to 19H are timing charts of signals in the logic circuit shown in FIG. 18.

FIG. 18 shows a logic circuit which generates an FSK-biased ASK signal in a optical transmission apparatus according to a third embodiment of the present invention. A subcarrier A18 is a subcarrier superposed on a base band signal 17, in other words a subcarrier for a main signal. A subcarrier B20 is output when subcarrier A18 is not output. A packet enable signal 19 attains a high level in synchronization with the timing in which the optical transmission apparatus transmits a packet.

An ASK signal 21 is generated by the logical product of base band signal 17 and subcarrier A18. An FSK-biased component 22 is generated by the logical product of the inverse of base band signal 17, packet enable signal 19 and subcarrier B20. The FSK-biased ASK signal 23 is generated by the logical sum of thus generated ASK signal 21 and FSK-biased component 22. The waveforms of these signals are given in FIGS. 19A to 19H.

Figure 5A:
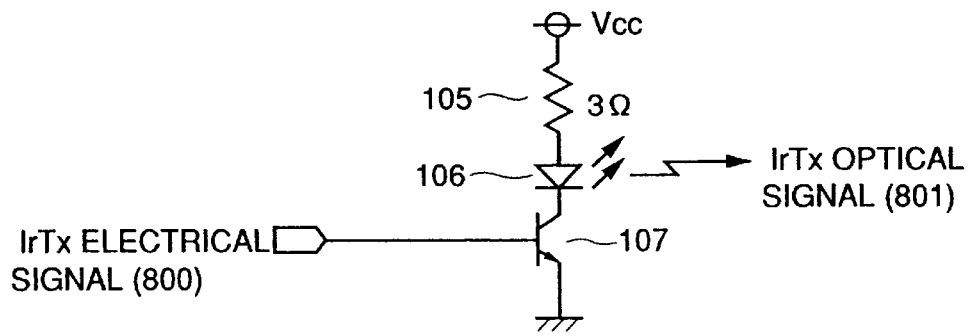
FIGS. 5A and 5B are diagrams each showing a conventional LED driving circuit.
Figure 5B:
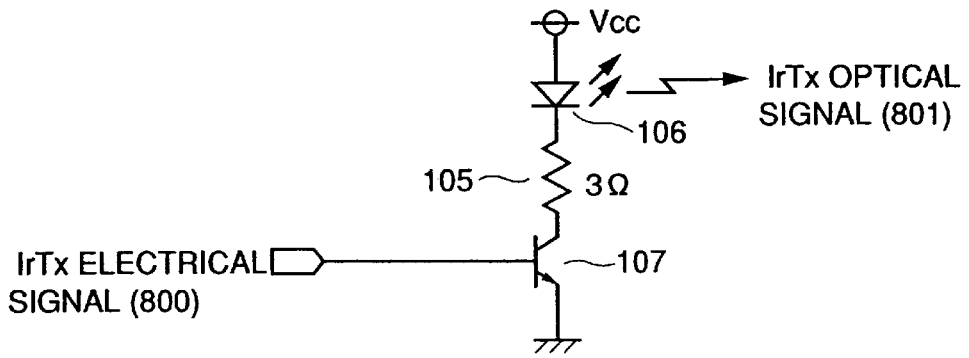
Figure 6A:
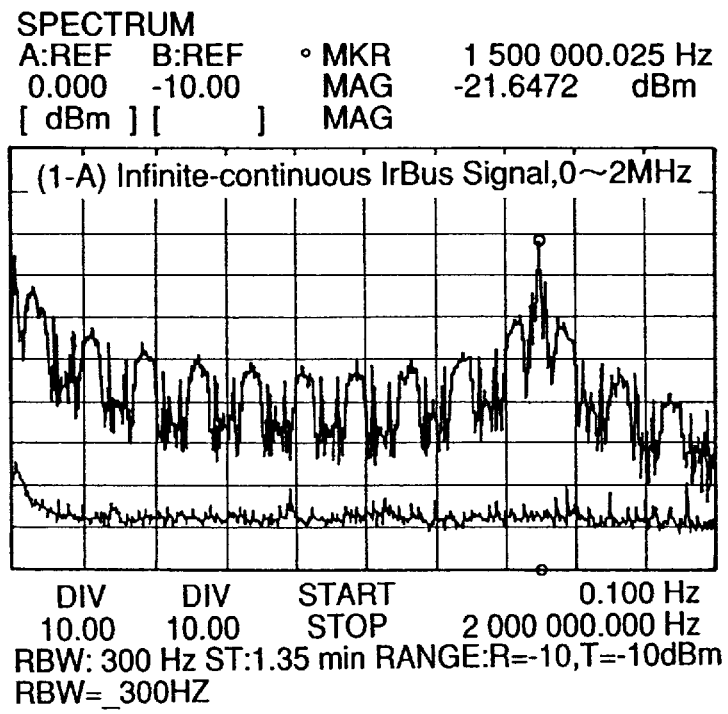
FIGS. 6A and 6B are graphs each showing a power spectrum when a conventional 16 PSM base band component signal is transmitted.
Figure 6B:
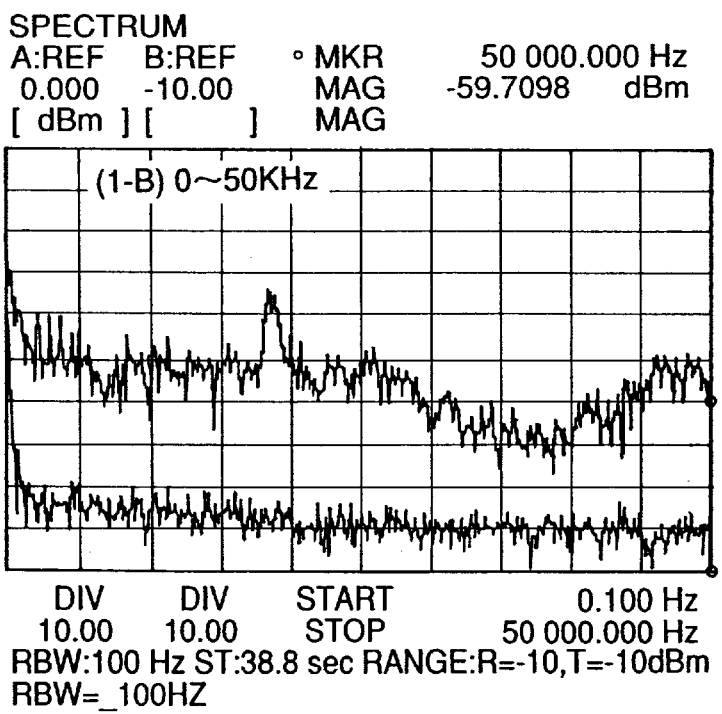
Figure 9A:
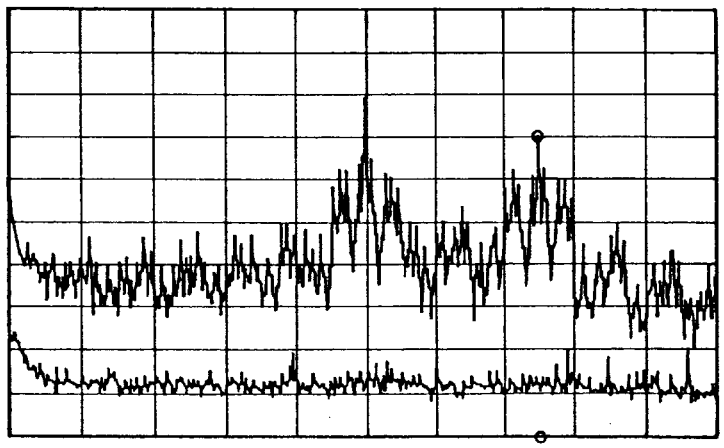
FIGS. 9A and 9B are graphs each showing a power spectrum when a signal modulated by a conventional FSK modulation method is transmitted.
Figure 9B:
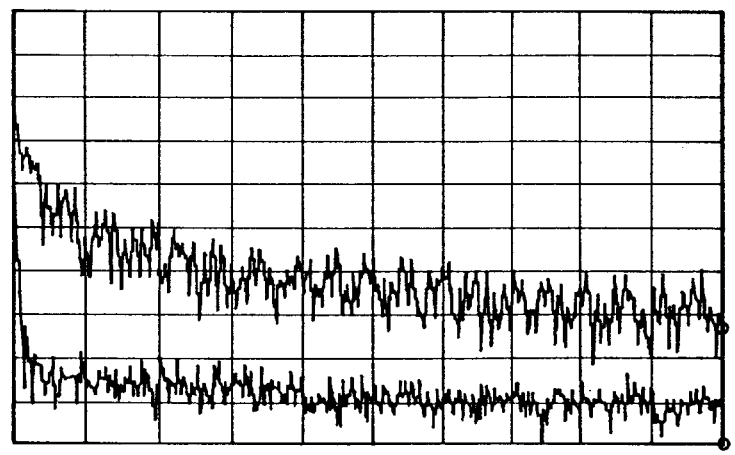

The FSK-biased ASK signal is converted into an optical signal when input in place of IrTx electrical signal 800 for example in the conventional LED driving circuit shown in FIG. 5A or 5B.

As described above, in the optical transmission apparatus according to the third embodiment, the power spectrum of the base band component may be reduced as is the case with the optical transmission apparatus according to the first or second embodiment, so that mutual interferences with an existing optical transmission apparatus may be reduced. The FSK-biased signal having a frequency different from that of the subcarrier in the main signal is ignored by an existing optical receiving apparatus, and therefore the optical receiving apparatus does not need any change.

Fourth Embodiment

The power spectrum of a base band component generated in a packet transmission with modulation in a carrier band modulation method where the base band component is constant includes a high frequency component, because the base band component fluctuates steeply at the start and end of transmission of the packet. An optical transmission apparatus according to a fourth embodiment of the present invention reduces such steep fluctuation of the base band component and reduces the density of the high frequency component of the power spectrum generated at the time of transmitting the packet.

Figure 20:
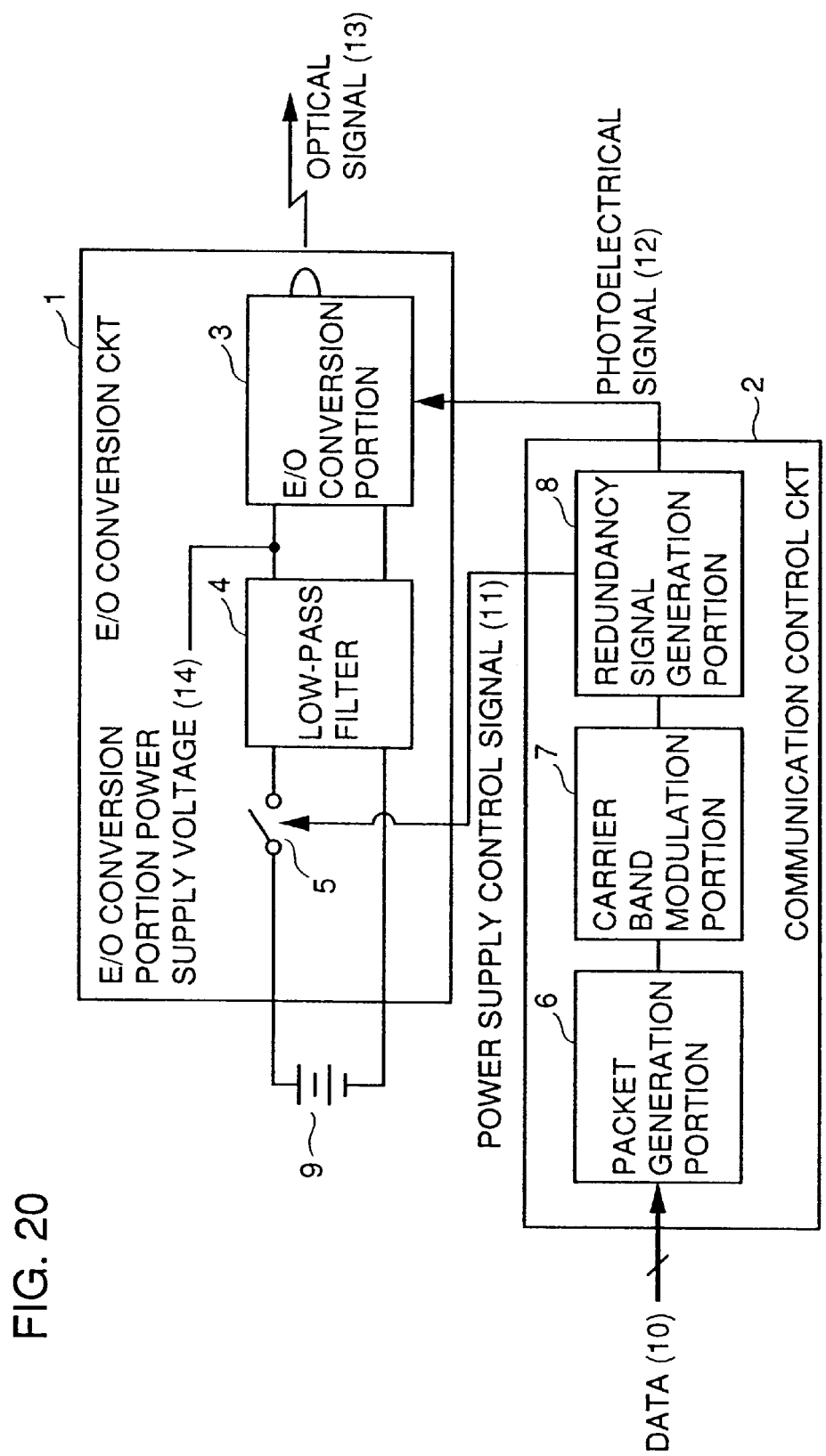
FIG. 20 is a block diagram showing the general configuration of an optical transmission apparatus according to a fourth embodiment of the present invention.

Referring to FIG. 20, a communication control circuit 2 includes a redundancy signal generation portion 8 which attaches a redundancy signal header and a redundancy signal tailer each having a time length of T at the start and end, respectively of a packet and generates a signal to control a switch 5, in addition to a conventional packet generation coding portion 6 and a carrier band modulation portion 7. An E/O conversion circuit 1 includes a low-pass filter 4 and switch 5, in addition to an E/O conversion portion 3. E/O conversion portion 3 converts a packet in the form of a photoelectrical signal 12 generated by communication control circuit 2 to an optical signal 13. The circuit may be implemented by the same circuit as the conventional E/O conversion portion.

Switch 5 controls supply or cut off of power supply to E/O conversion portion 3. Switch 5 is controlled by a power supply control signal 11 output from communication control circuit 2A low-pass filter 4 interposed between switch 5 and E/O conversion portion 3 is set such that its rising/falling time T' is smaller than the output time T of the redundancy signal.

Figure 21:
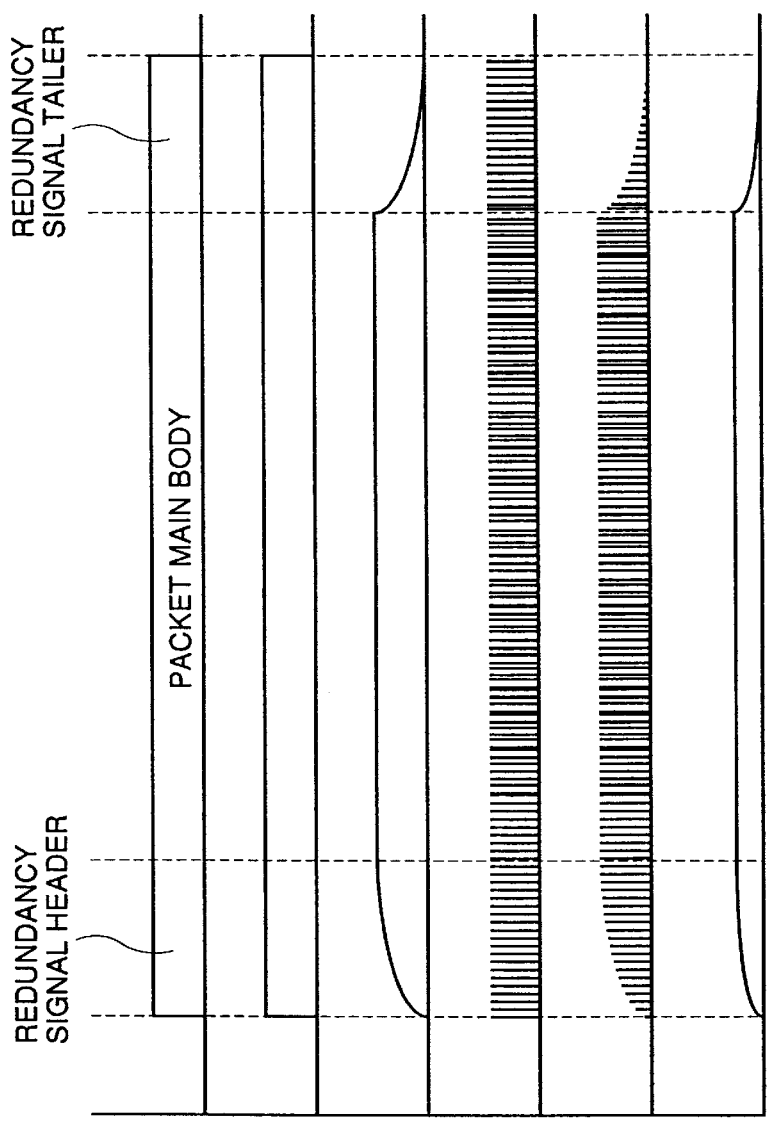
FIGS. 21A to 21F are timing charts of signals in the optical transmission apparatus according to the fourth embodiment.

FIG. 21A shows the composition of a packet transmitted by the optical transmission apparatus according to the fourth embodiment. Packet 15 is attached with redundancy signals at the start and end of the packet in contrast to the conventional packet. The redundancy signal attached at the start of the packet is called "redundancy signal header", and the redundancy signal attached at the end of the packet is called "redundancy signal tailer". These redundancy signals are not recognized or do not have any meanings in conventional packet communications.

These redundancy signals must have a pattern different from those having particular meanings in packet communications such as a start flag representing the start of a packet, and a stop flag representing the end of the packet.

In an optical communication, a symbol for synchronization or AGC (Automatic Gain Control) or symbols for both are sometimes transmitted before the start flag. If the symbols are sufficiently longer than the rising time T' as described above, these symbols may be used as redundancy signal headers. If the symbols are not long enough, the symbols may be repeated to meet a necessary time period for transmission.

If the waveform of the base band component is directly changed at the start or end part of a conventional packet, the packet might not be recognized as a correct packet, and therefore the waveform is changed in the redundancy signal header and redundancy signal tailer.

A packet generating/coding portion 6 divides input data 10 on a packet-basis, and pieces of data divided on the packet-basis are coded into serial signals and output as a packet. Carrier band modulation portion 7 superposes a subcarrier on the serial signals. Redundancy signal generating portion 8 attaches the above-described redundancy signal header and redundancy signal tailer to the start and the end of the packet, which is output as a photoelectrical signal 12 to E/O conversion portion 3.

FIGS. 21B to 21E show the relation between power supply control signal 11, E/O conversion portion power supply voltage 14, photoelectrical signal 12, and optical signal 13. Power supply control signal 11 attains a high level simultaneously with output of the redundancy signal header. Power supply control signal 11 attaining a high level simultaneously turns on switch 5, which allows power to be supplied to E/O conversion portion 3. The power passes through low-pass filter 4, and therefore E/O conversion portion power supply voltage 14 gradually increases toward the level of the power supply voltage.

The amplitude of an optical signal output from E/O conversion circuit 1 increases as E/O conversion portion power supply voltage 14 increases. If the output time of the redundancy signal header is sufficiently large for the rising time of low-pass filter 4, E/O conversion portion power supply voltage 14 is equal to the power supply voltage when the photoelectrical signal of the packet body starts to be output, and the amplitude of the optical signal becomes constant.

When the output of the photoelectrical signal from the packet body completes, power supply control signal 11 attains a low level, which turns off switch 5, and the power supply to E/O conversion portion 3 is cut off, but by the function of low-pass filter 4, E/O conversion portion power supply voltage 14 gradually decreases towards 0V. As a result, the amplitude of the redundancy signal tailer of optical signal 13 decreases as E/O conversion portion power supply voltage 14 decreases.

If the output time of the redundancy signal tailer is set sufficiently large for the rising time of low-pass filter 4, E/O conversion portion power supply voltage 14 reaches 0 V until the output of the redundancy signal tailer completes.

Therefore, the waveforms of optical signal 13 and optical signal base band component 16 are as shown in FIGS. 21E and 21F, respectively. Optical signal base band component pattern 16 is equivalent to a waveform produced by passing a square waveform through a low-pass filter. As shown in FIG. 22, among power spectra generated by a packet transmission base band component, the density of a power spectrum equal to or greater than the cut off frequency f0 of the low-pass filter may be reduced.

As in the foregoing, in the optical transmission apparatus according to the fourth embodiment, the fluctuation of the base band component is relaxed at the start and end of a packet transmission, the density of a high frequency component in a power spectrum generated by the base band component may be reduced, which may reduce mutual interferences with an existing optical transmission apparatus.

Fifth Embodiment

Figure 23:
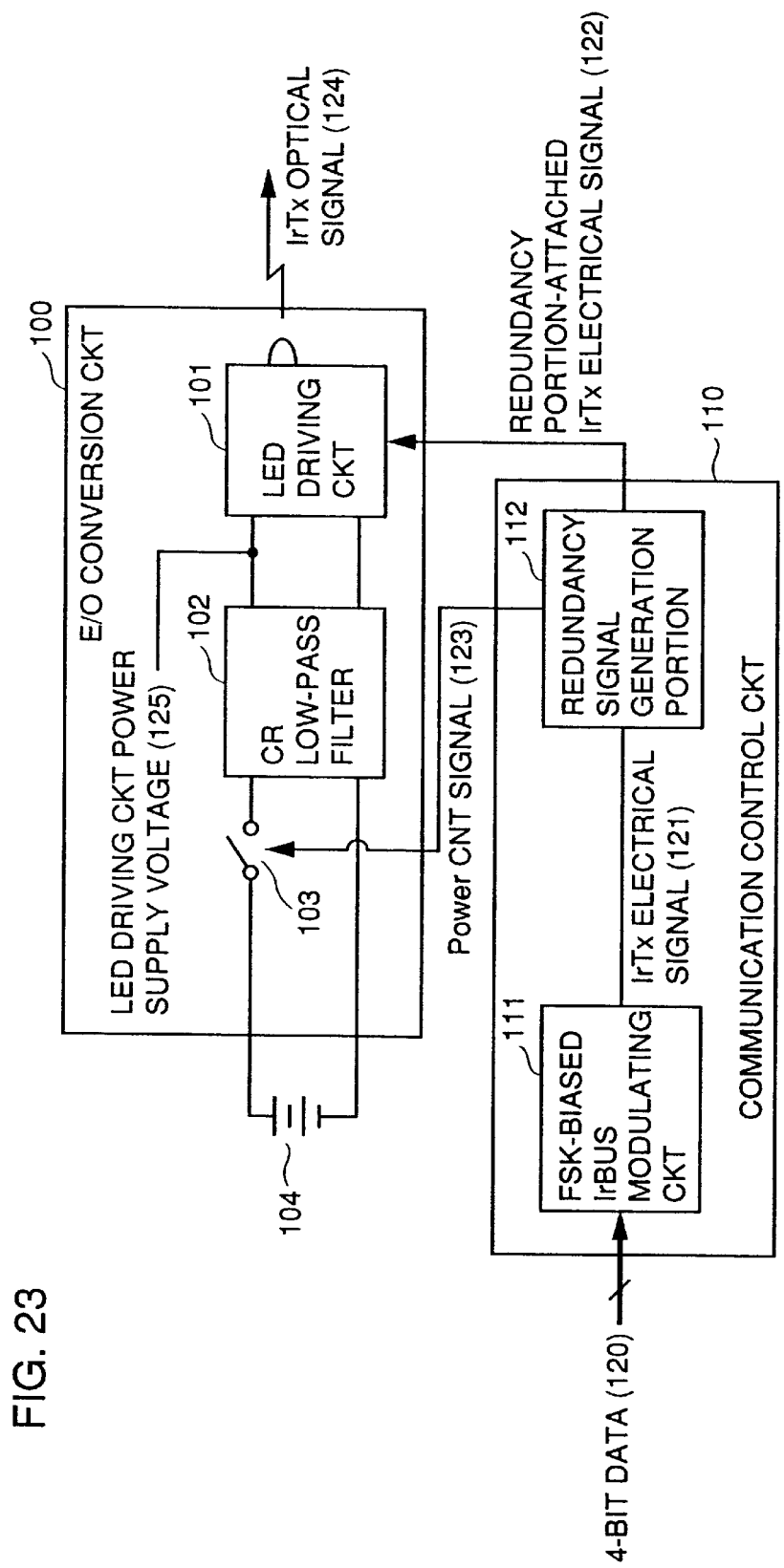
FIG. 23 is a block diagram showing the general configuration of an optical transmission apparatus according to a fifth embodiment of the present invention.

FIG. 23 shows the configuration of an optical transmission apparatus according to a fifth embodiment of the present invention. The optical transmission apparatus includes a communication control circuit 110 which FSK-biases a packet according to an IrBUS method and attaches a redundancy signal at the start and end of a packet, and an E/O conversion circuit 100 which converts an electrical signal into an optical signal such that the base band component fluctuates more gradually at the start and end of a packet output from communication control circuit 110.

Communication control circuit 110 includes an FSK-biased IrBUS modulation circuit 111 which modulates 4-bit data 120 in an IrBUS method to generate an IrTx electrical signal 121 and a redundancy signal generation portion 112 which attaches redundancy signals at the start and end of IrTx electrical signal 121 in a packet form to output the resultant signal as a redundancy portion-attached IrTx electrical signal 122 and to generate a Power CNT signal 123. Note that in FSK-bias modulation circuit 111, IrTx electrical signal 121 which is an IrBUS signal, FSK-biased by the logic circuit shown in FIG. 18 is generated.

E/O conversion circuit 100 includes a switch 103 which controls the supply of power from power supply 104 by Power CNT signal 123 output from redundancy signal generation portion 112, a CR low-pass filter 102 supplies with power 104 through switch 103, and an LED driving circuit 101 which converts redundancy portion-attached IrTx electrical signal 122 generated by redundancy signal generation portion 112 into an optical signal to output the resultant signal as an IrTx optical signal 124.

Figures 25A, 25B:
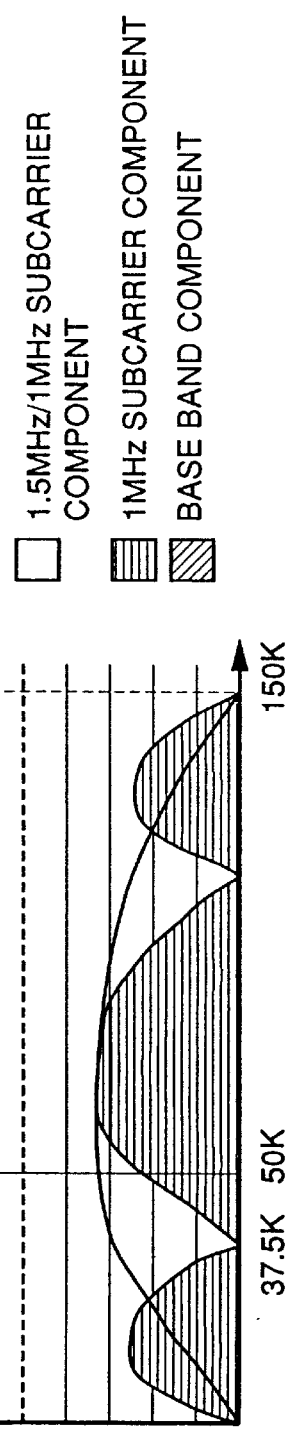
FIGS. 25A and 25B are graphs showing the power spectrum of an FSK-biased signal output from the optical transmission apparatus according to the fifth embodiment, which are each divided into a subcarrier component and a base band component.
Figure 26A:
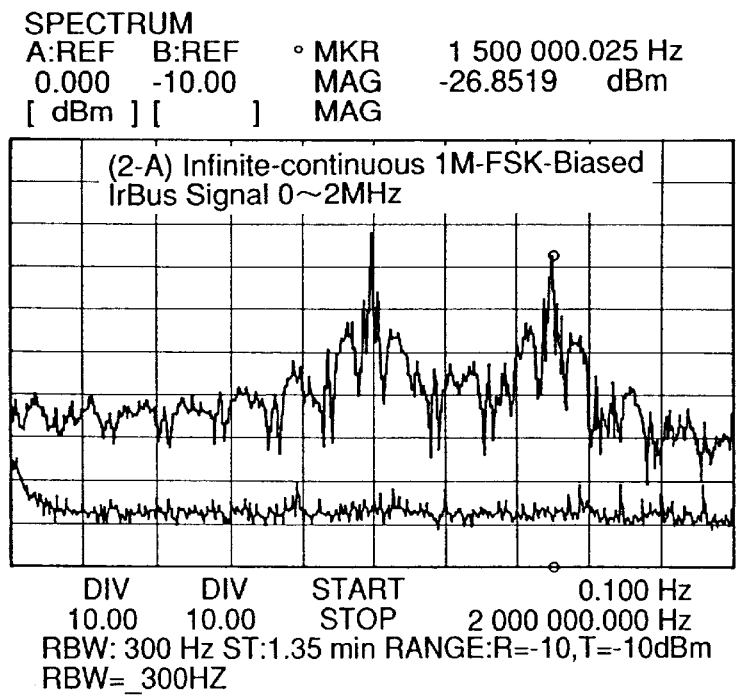
FIGS. 26A and 26B are graphs each showing the power spectrum of an FSK-biased signal output from the optical transmission apparatus according to the fifth embodiment.
Figure 26B:
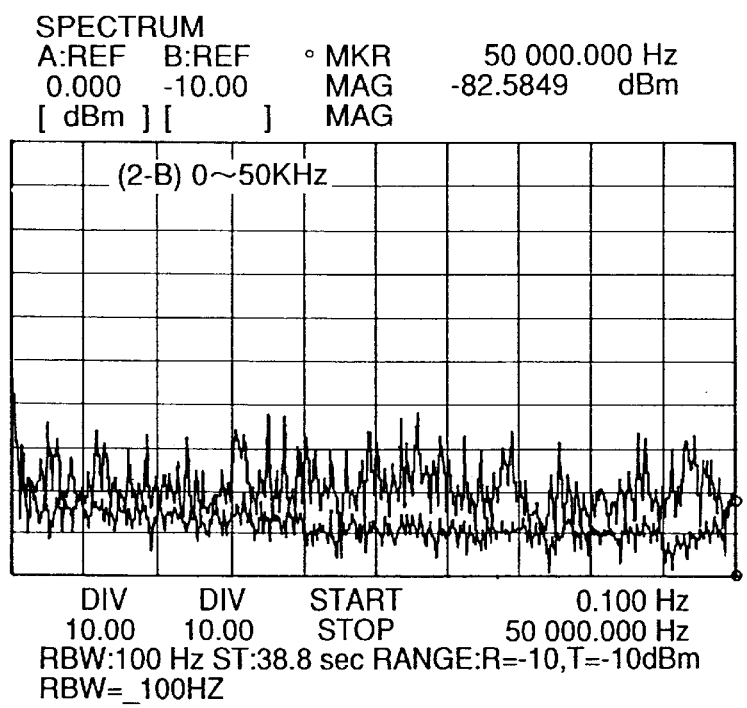

FIGS. 24A to 24C show the signal waveform, subcarrier component and base band component of IrTx electrical signal 121. The FSK biasing makes constant the DC level of the base band component, and therefore the sub lobe of the power spectrum by the base band component as IrTx electrical signal 121 is continuously output occurs only at 0 Hz as shown in FIGS. 25A and 25B. FIGS. 26A and 26B each show a power spectrum when IrTx electrical signal 121 is continuously output.

Figure 27:
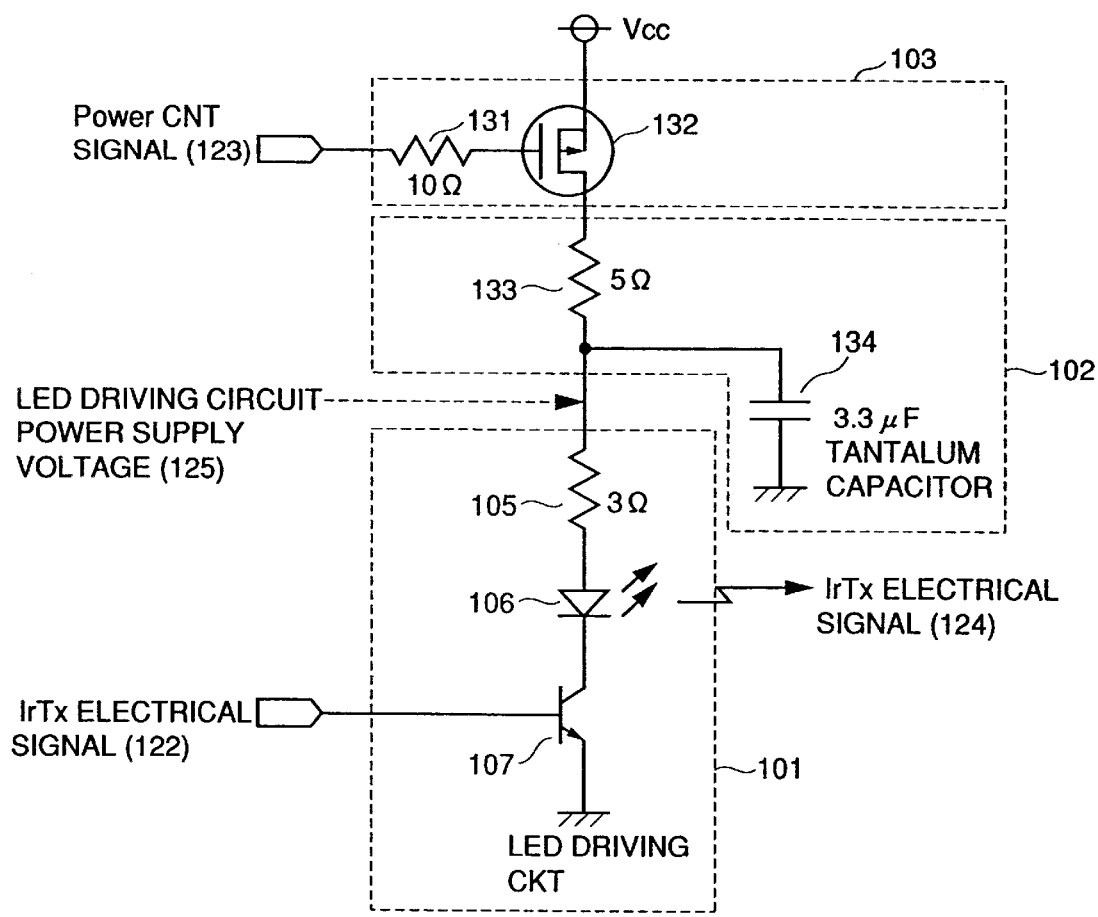
FIG. 27 is a diagram showing the configuration of an E/O conversion circuit 100 in the optical transmission apparatus according to the fifth embodiment.

FIG. 27 shows the configuration of E/O conversion portion 100 shown in FIG. 23. E/O conversion portion 100 includes a CMOS switch 103 which controls the supply of power supply 104 with Power CNT signal 123, a CR low-pass filter 102 including a capacitor 134 and a resistor 133, and an LED driving circuit 101 which converts IrTx electrical signal 122 into an optical signal and outputs the resultant signal as IrTx optical signal 124. CMOS switch 103 includes a damping resistor (10Ω) 131, and a CMOS transistor 132 provided with Power CNT signal 123 at its gate terminal through damping resistor 131. The output of CMOS switch 103 is input to LED current limiting resistor 105 in LED driving circuit 101 through CR low-pass filter 102. Note that LED driving circuit 101 is the same as the conventional LED driving circuit shown in FIG. 5A, and therefore a detail description thereof is not provided.

CR low-pass filter 102 has its cut off frequency $f_0$ and rising time T set as follows:

$$f_0 = \omega_0/2\pi = (1/CR)/2\pi$$
$$= (1/(3.3 \mu F \times 5\Omega))/2\pi = 9650 \text{ Hz}$$
$$T = 2.2 \text{ CR} = 2.2 \times 3.3 \mu F \times 5\Omega = 36.3 \mu s$$

FIG. 28A shows the composition of a packet according to a conventional IrBUS method. FIGS. 28B to 28H show a packet composition, control signals and optical signals according to this embodiment. According to the conventional IrBUS method, a 1.5 MHz subcarrier symbol is transmitted for AGC adjustment at the start of transmitting the packet. According to this embodiment, as shown in FIG. 28B, this AGC symbol is extended for 38 μs (corresponding to 1.5 MHz pulses as many as 57), and the portion is used as a redundancy signal header.

According to the conventional IrBUS method, a stop flag (STO) is transmitted at the end of transmitting a packet. According to this embodiment, however, as shown in FIG. 28B, a 1 MHz subcarrier is added for 37 μs (1 MHz pulses as many as 37) after the STO, and the portion is used as a redundancy signal tailer.

Simultaneously with the start of outputting the redundancy signal header, Power CNT signal 123 which controls CMOS switch 103 attains a low level. At the time, CMOS switch 103 is turned on, which allows power to be supplied to LED driving circuit 101, and the power is passed through CR low-pass filter 102, so that LED driving circuit power supply voltage 125 exponentially increase as shown in FIG. 28D.

Figure 28:
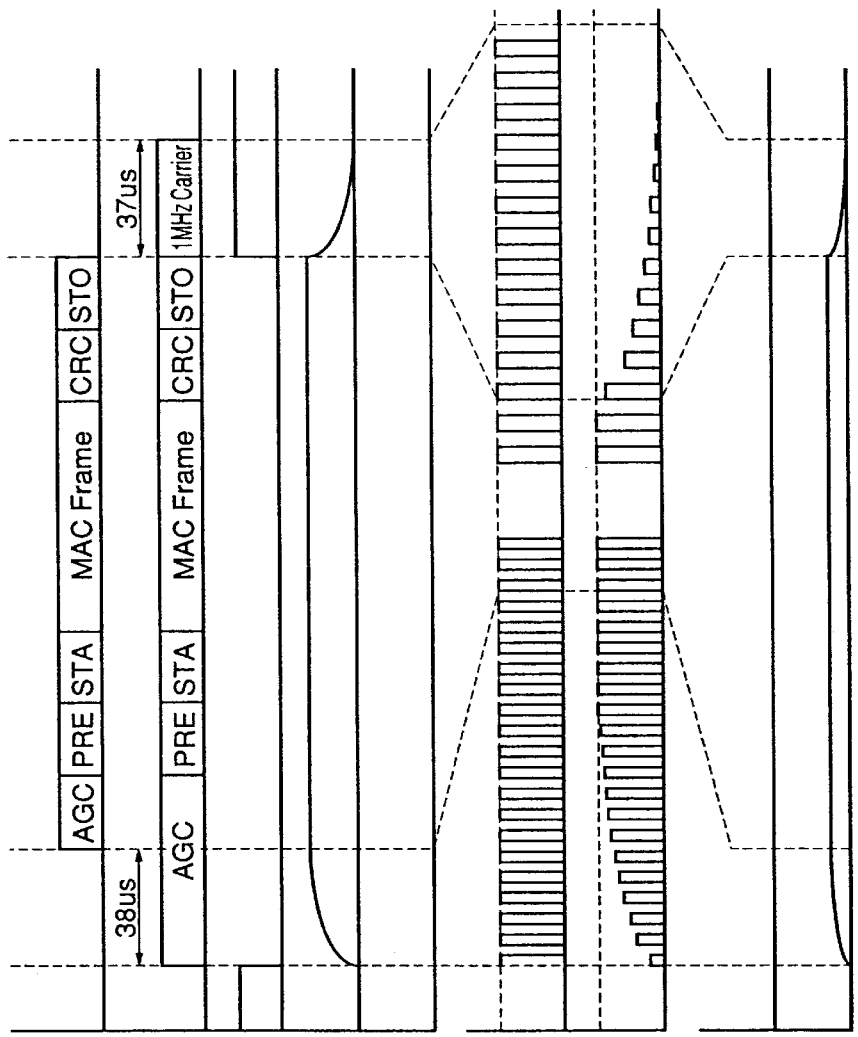
FIGS. 28A to 28I are timing charts of signals in the optical transmission apparatus according to the fifth embodiment.

The amplitude of redundancy portion-attached IrTx optical signal 124 at the start of the transmission is amplified as a function of LED driving circuit power supply voltage 125. The AGC symbol is extended for 38 μs as compared to the AGC symbol of the conventional packet. Since the rising time T of CR low-pass filter 102 is 36.3 μs, LED driving circuit power supply voltage 125 is substantially equal to the power supply voltage when the extended part of the AGC symbol completes, and the amplitude of redundancy portion-attached IrTx optical signal 124 is output at 100% as shown in FIG. 28. Therefore, the essential AGC function is not affected.

As shown in FIG. 28C, when the output of the STO is over, Power CNT signal 123 attains a high level. Thus, CMOS switch 103 is turned off, the power supplied to LED driving circuit 101 is cut off, and as shown in FIG. 28D, LED driving circuit power supply voltage 125 exponentially decreases by the function of CR low-pass filter 102. As a result, the amplitude of redundancy portion-attached IrTx optical signal 124 gradually decreases as a function of LED driving circuit power supply voltage 125. Since the redundancy signal tailer has a length of 37 μs, LED driving circuit power supply voltage 125 reaches 0V during this period, and the amplitude of the redundancy portion-attached IrTx optical signal 124 becomes 0 as shown in FIG. 28G. The waveform of the redundancy portion-attached IrTx optical signal 124 thus output and the base band component are given in FIGS. 28H and 28I, respectively.

As in the foregoing, in the optical transmission apparatus according to this embodiment, since a modulation signal according to an IrBUS method is FSK-biased, the base band component is allowed to gradually change at the start and end of a packet, mutual interferences in optical transmission apparatuses may be even more reduced as compared to the optical transmission apparatuses according to the third and fourth embodiments.

Sixth Embodiment

Figure 29:
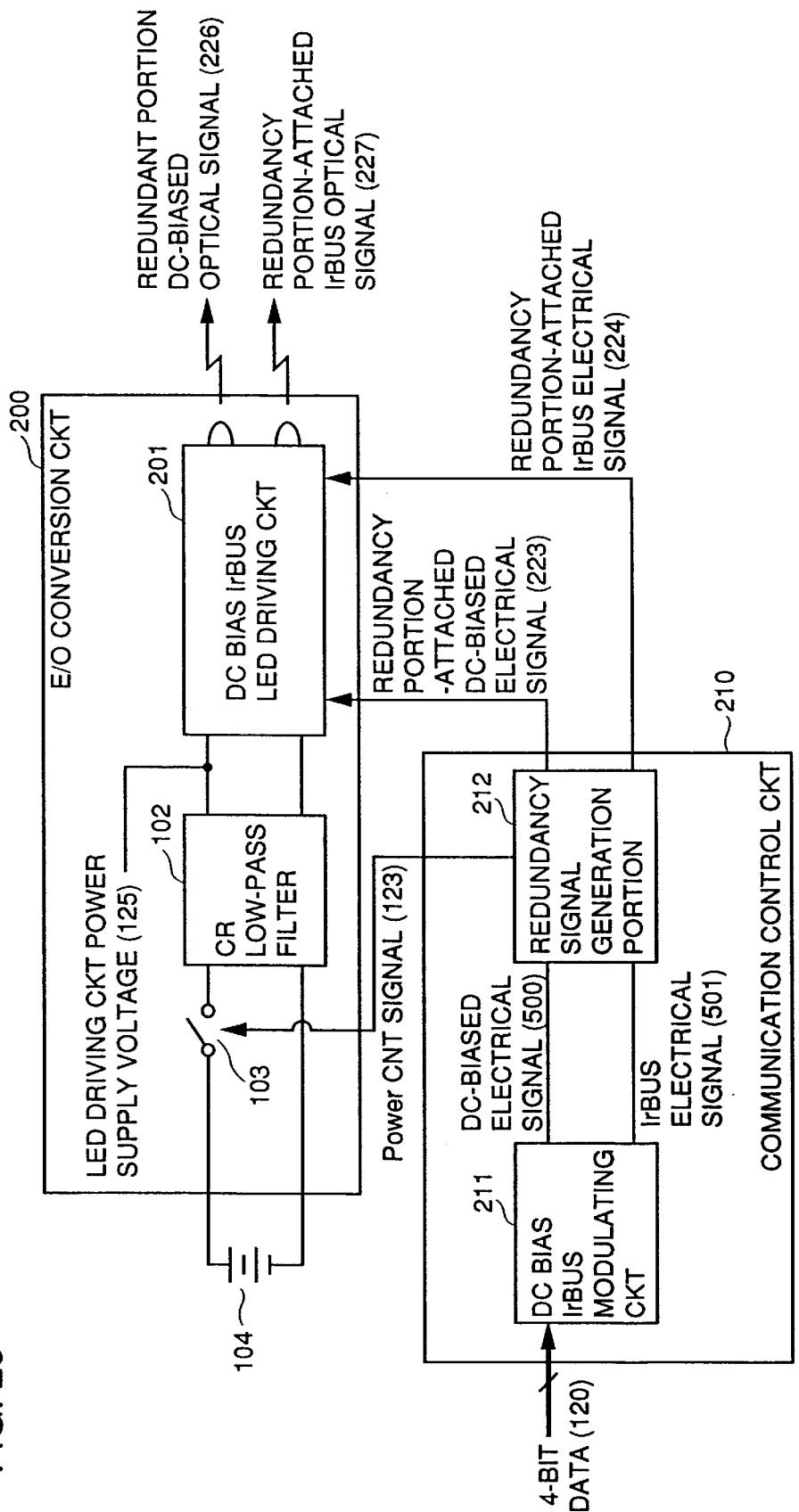
FIG. 29 is a diagram showing the general configuration of an optical transmission apparatus according to a sixth embodiment of the present invention.

FIG. 29 shows the configuration of an optical transmission apparatus according to a DC bias IrBUS method according to a sixth embodiment of the present invention. The optical transmission apparatus includes a communication control circuit 210 which generates a DC-biased electrical signal 500 and an IrBUS electrical signal 501 and attaches a redundancy signal at the start and end of the packets of these signals, and an E/O conversion circuit 200 which converts an electrical signal into an optical signal such that a base band component gradually changes at the start and end of the packet output from communication control circuit 210.

Communication control circuit 210 includes a DC-biased IrBUS modulation circuit 211 which modulates 4-bit data 120 in an IrBUS method to generate an IrBUS electrical signal 501 and generates a DC-biased electrical signal 500, and a redundancy signal generation portion 212 which attaches a redundancy signal to DC-biased electrical signal 500 and IrBUS electrical signal 501 at the start and end of a packet to output a redundancy portion-attached DC-biased electrical signal 223 and a redundancy portion-attached IrBUS electrical signal 224, and generates Power CNT signal 123.

E/O conversion circuit 200 includes a switch 103 which controls the supply of power 104 with Power CNT signal 123 output from redundancy signal generation portion 212, a CR low-pass filter 102 supplied with power 104 through switch 103, and an LED driving circuit for DC bias IrBUS 201 which generates a redundancy portion-attached DC-biased optical signal 226 and a redundancy portion-attached IrBUS optical signal 227 from redundancy portion-attached DC-biased electrical signal 223 and redundancy portion-attached IrBUS electrical signal 224, respectively generated by redundancy signal generation portion 212.

DC bias IrBUS modulation circuit 211 and DC bias IrBUS LED diiving circuit 201 have the same configurations as those in the first embodiment in FIGS. 11A and 11B, and therefore a detailed description is not provided.

Figure 30:
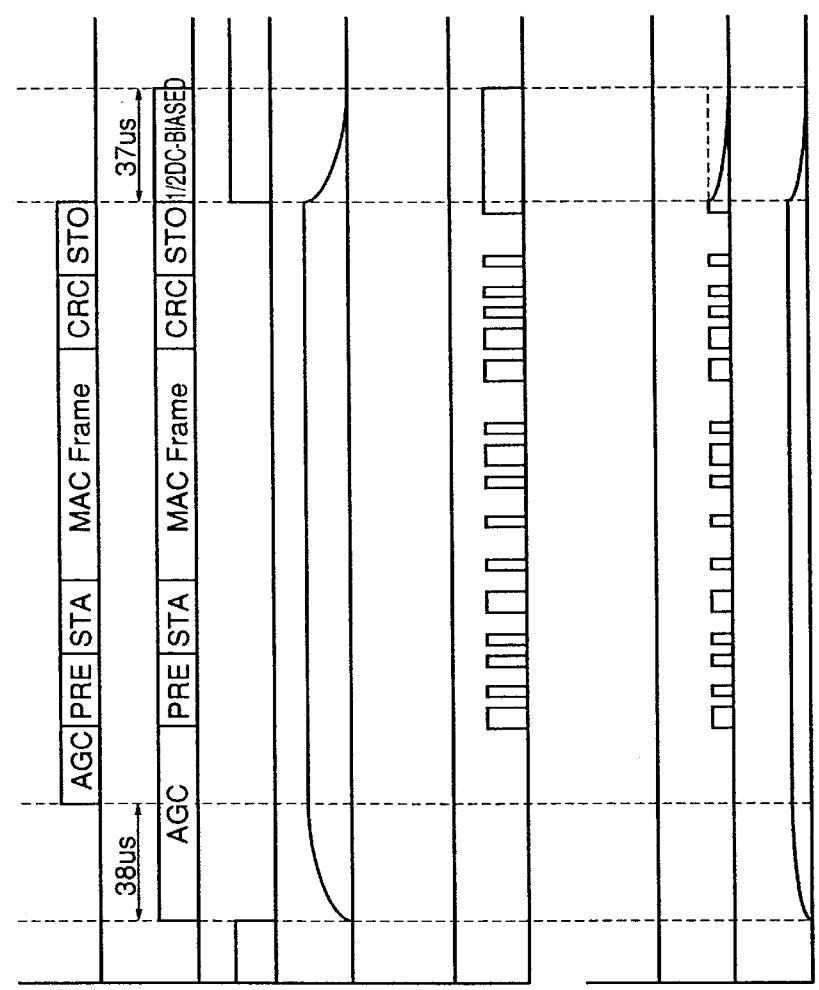
FIGS. 30A to 30I are timing charts of signals in the optical transmission apparatus according to the sixth embodiment.

FIG. 30B shows the configuration of a packet according to this embodiment. A redundancy signal header is produced by extending an AGC signal as is the case with the optical transmission apparatus according to the fifth embodiment. A redundancy signal tailer is a ½ amplitude DC-biased signal having a length of 37 μs. Redundancy signal generation portion 212 attaches redundancy signals to DC-biased electrical signal 500 and IrBUS electrical signal 501 to generate a redundancy portion-attached DC-biased electrical signal 223 and a redundant portion IrBUS electrical signal 224, respectively.

Figure 31:
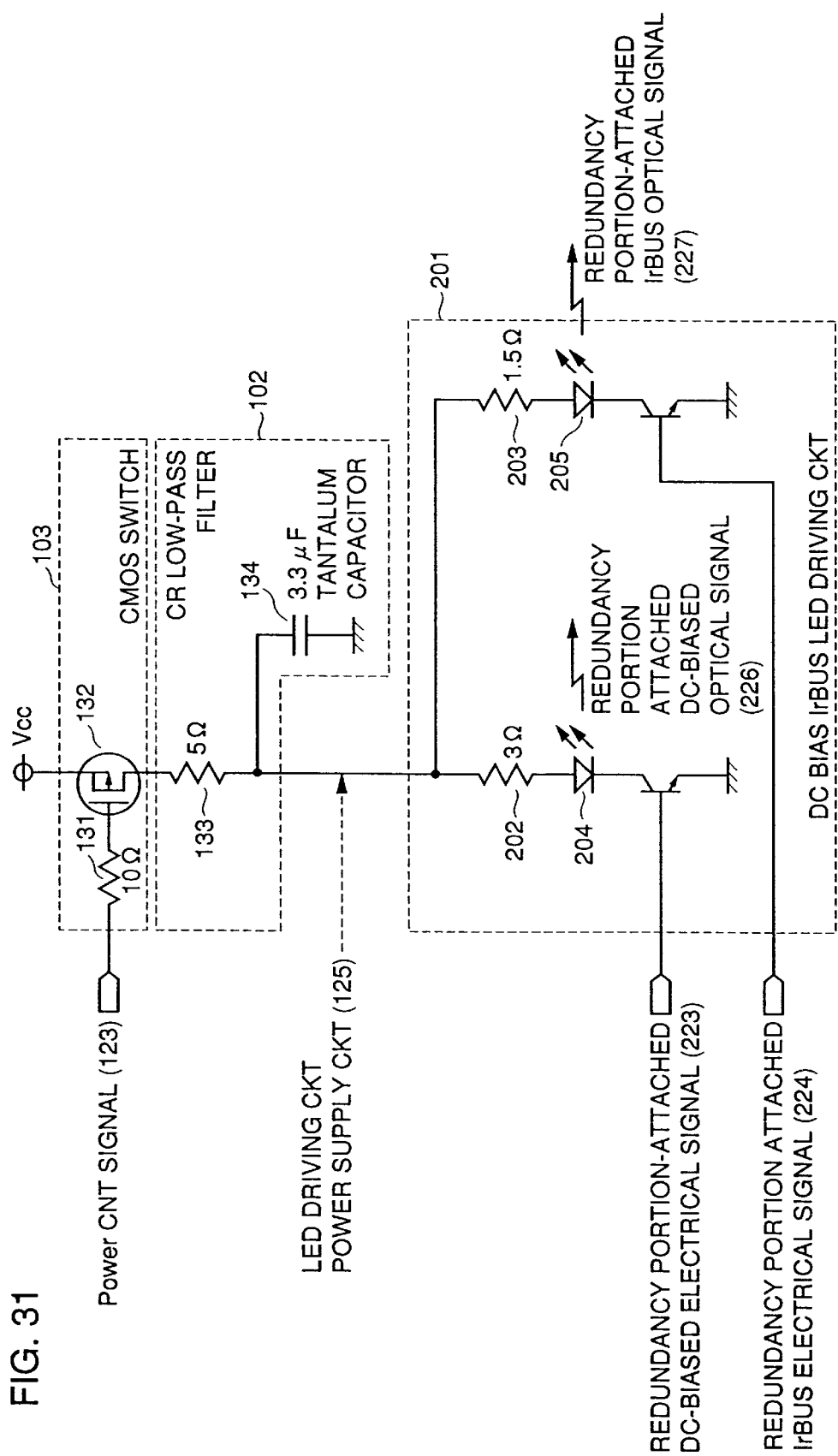
FIG. 31 is a diagram showing the configuration of an E/O conversion circuit 200 in the optical transmission apparatus according to the sixth embodiment.

FIG. 31 shows the configuration of an E/O conversion circuit 200 according to this embodiment. The circuit includes a DC bias IrBUS LED driving circuit 201 according to the first embodiment shown in FIG. 11A, CR low-pass filter 102, and CMOS switch 103 described in conjunction with the fourth embodiment. The output of CMOS switch 103 is input to LED current limiting resistor 105 in DC bias IrBUS LED driving circuit 201 as an LED driving circuit power supply voltage 125 through CR low-pass filter 102.

FIGS. 30G and 30H show the waveforms of redundancy portion-attached IrBUS optical signal 227 and redundancy portion-attached DC-biased IrBUS optical signal 226 output from the optical transmission apparatus according to this embodiment. FIG. 30I shows the waveform of the sum of the base band components of redundancy portion-attached IrBUS optical signal 227 and redundancy portion-attached DC-biased optical signal 226.

As described above, in the optical transmission apparatus according to this embodiment, a modulation signal according to an IrBUS method is DC biased, the base band component is allowed to change gradually at the start and end of a packet, and therefore mutual interferences may be even more reduced as compared to the optical transmission apparatuses according to the first and fourth embodiments.

Seventh Embodiment

Figure 32:
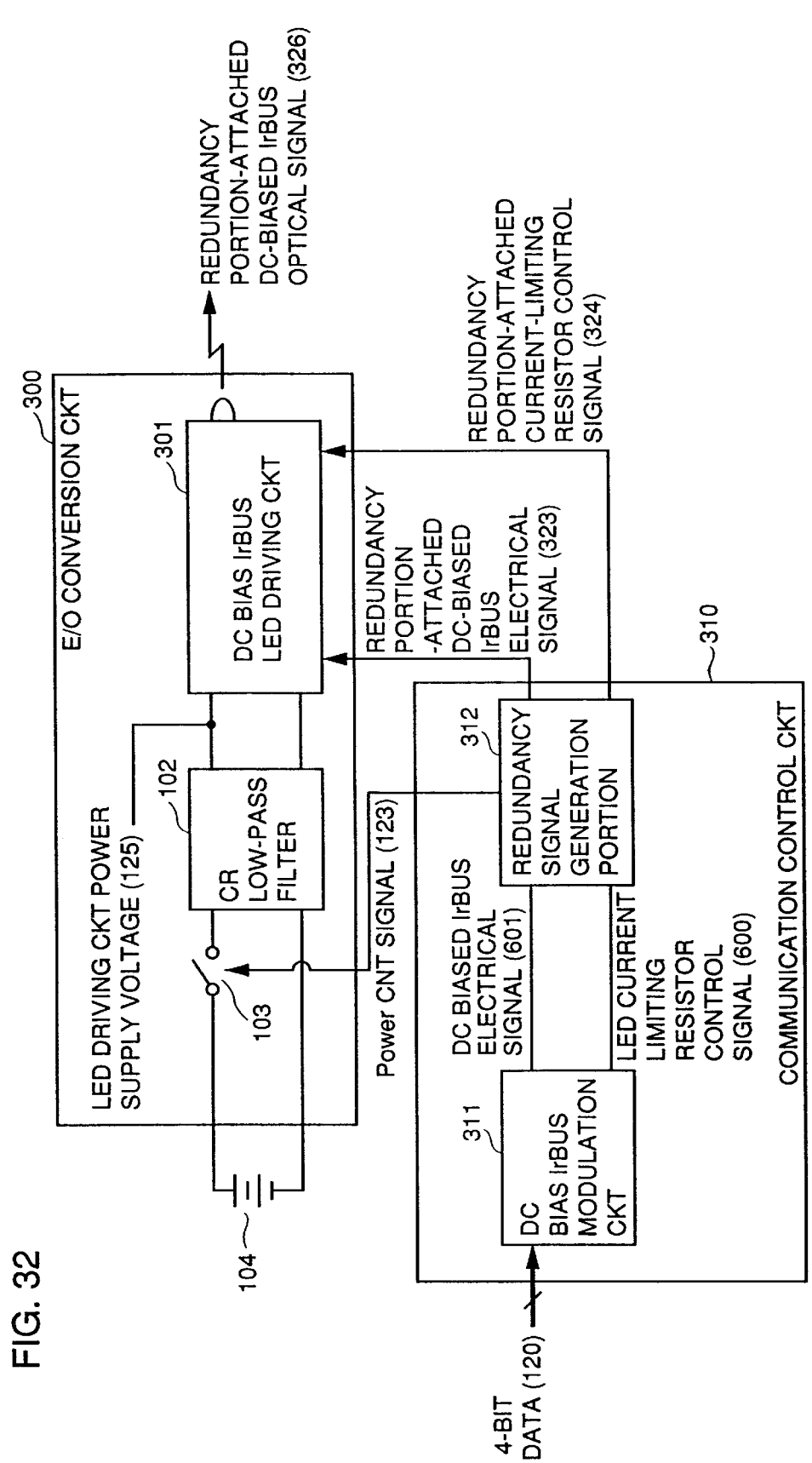
FIG. 32 is a block diagram of the general configuration of an optical transmission apparatus according to a seventh embodiment of the present invention.

FIG. 32 shows the configuration of an optical transmission apparatus according to a seventh embodiment of the present invention. The optical transmission apparatus includes a communication control circuit 310 which generates a DC-biased IrBUS electrical signal 601 and an LED current limiting resistor control signal 600, and attaches redundancy signals to these signals at the start and the end of each packet, and an E/O conversion circuit 300 which converts an electrical signal into an optical signal such that its base band component changes gradually at the start and the end of the packet output from communication control circuit 310.

Communication control circuit 310 includes a DC bias IrBUS modulation circuit 311 which modulates 4-bit data 120 in an IrBUS method and DC-biases the data to generate a DC-biased IrBUS electrical signal 601, and generates an LED current-limiting resistor control signal 600 and a redundancy signal generation portion 312 which attaches redundancy signals to DC-biased IrBUS electrical signal 601 and LED current-limiting resistor control signal 600 at the start and the end of each packet to output a redundancy portion-attached DC-biased IrBUS electrical signal 323 and redundancy portion-attached LED current-limiting resistor control signal 324, and generates a Power CNT signal 123 as well.

E/O conversion circuit 300 includes a switch 103 which controls the supply of power 104 with Power CNT signal 123 output from redundancy signal generation portion 312, a CR low-pass filter 102 supplied with power 104 through switch 103, and a DC bias IrBUS LED driving circuit 301 which generates and outputs a redundancy portion-attached DC-biased IrBUS optical signal 326 from redundancy portion-attached DC-biased IrBUS electrical signal 323 and redundancy portion-attached LED current limiting resistor control signal 324 which are generated by redundancy signal generation portion 312.

Figure 33:
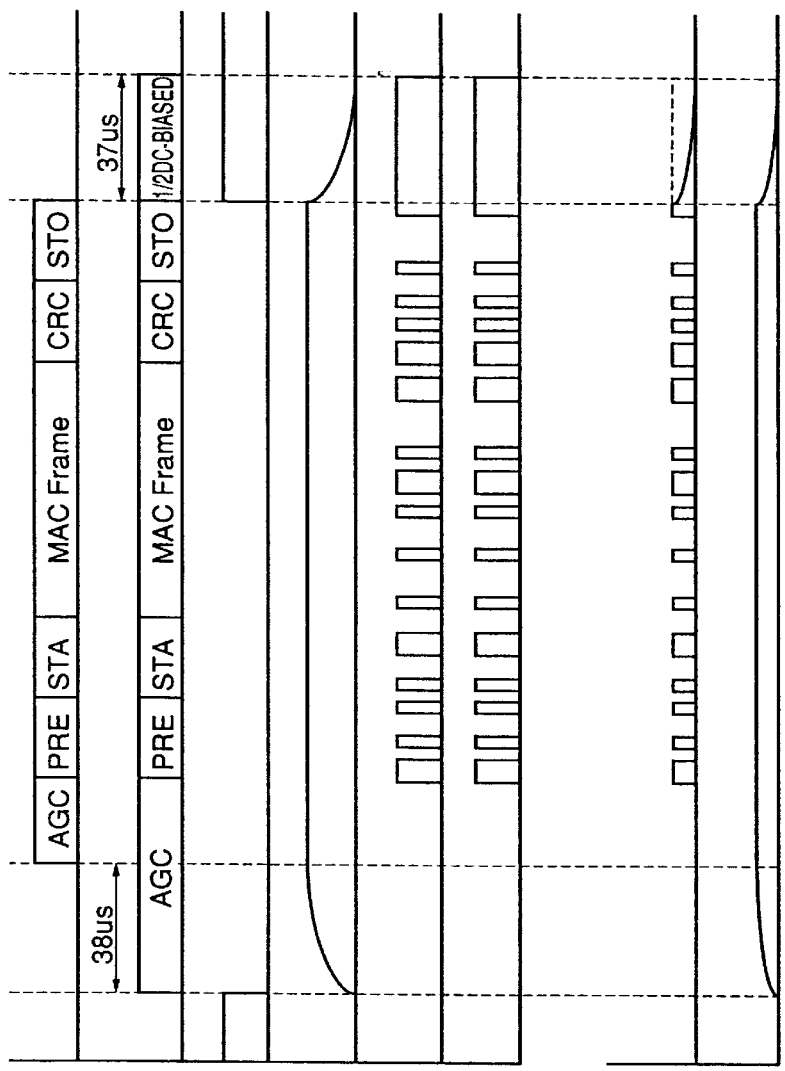
FIGS. 33A to 33H are timing charts of signals in the optical transmission apparatus according to the seventh embodiment.

DC bias IrBUS modulation circuit 311 and DC bias IrBUS LED driving circuit 301 have the same configurations as those in the second embodiment shown in FIG. 16A. FIG. 33B shows the configuration of a packet according to the embodiment. The packet configuration is the same as that in the sixth embodiment, and therefore a detailed description is not provided.

DC bias IrBUS modulation circuit 311 generates DC-biased IrBUS electrical signal 601 and LED current limiting resistor control signal 600 shown in FIG. 33A from input 4-bit data 120. Redundancy signal generation portion 312 attaches redundancy signals to DC-biased IrBUS electrical signal 601 and LED current limiting resistor control signal 600 to generate a redundancy portion-attached DC-biased IrBUS electrical signal 323 and a redundancy portion-attached LED current limiting resistor control signal 324, respectively as shown in FIGS. 33E and 33F. Redundancy signal generation portion 312 also generates and outputs Power CNT signal 123 as shown in FIG. 33C.

Figure 34:
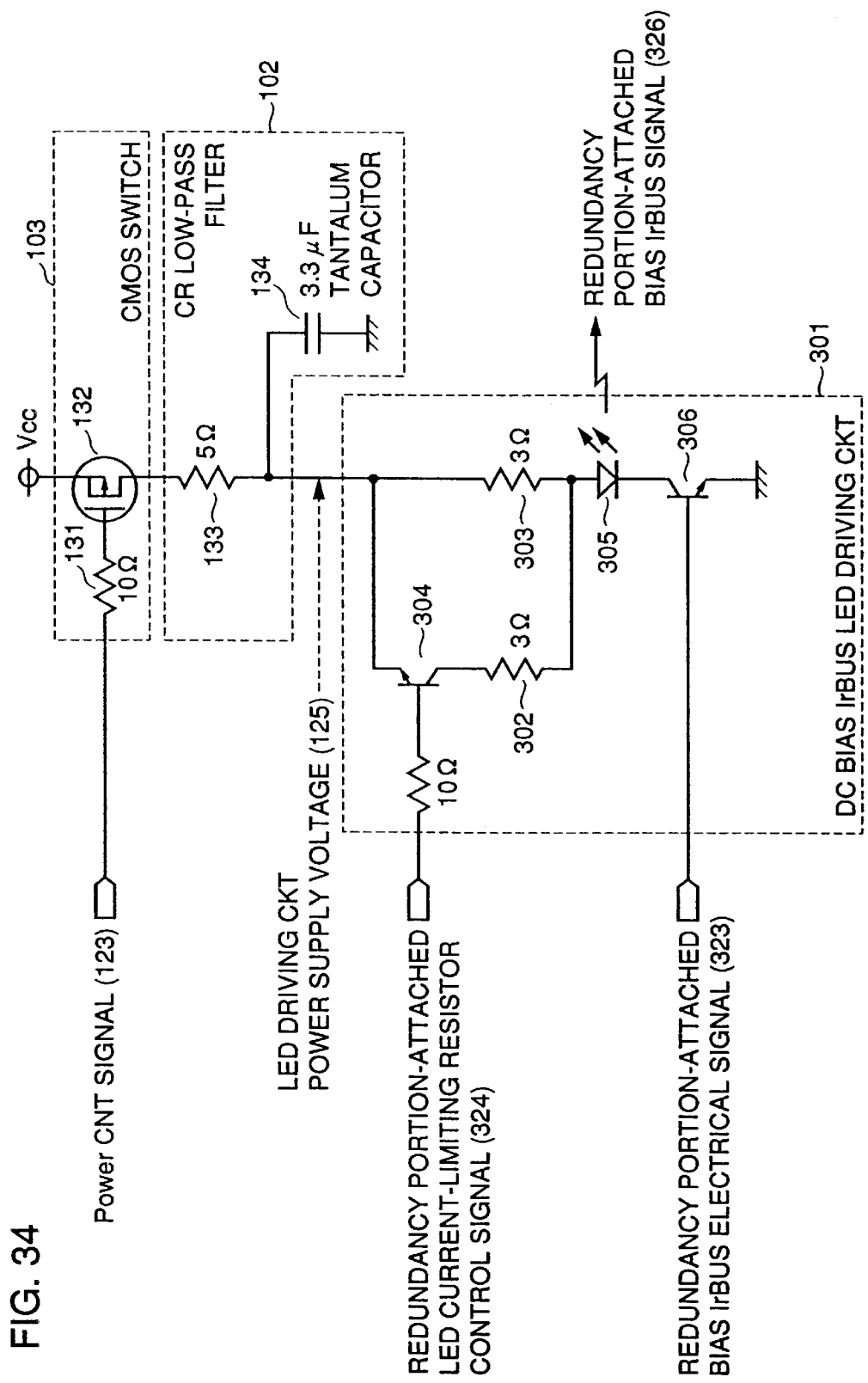
FIG. 34 is a diagram showing the configuration of an E/O conversion circuit 300 in the optical transmission apparatus according to the seventh embodiment.

FIG. 34 shows the configuration of an E/O conversion circuit 300 according to this embodiment. E/O conversion circuit 300 includes DC bias IrBUS LED driving circuit 301 according to the second embodiment shown in FIG. 16B, and CR low-pass filter 102 and CMOS switch 103 described in conjunction with the fifth embodiment. The output of CMOS switch 103 is input to DC bias IrBUS LED circuit 301 as LED driving circuit power supply voltage 125 through CR low-pass filter 102. LED driving circuit power supply voltage 125 is input to the emitter of transistor 304 in DC bias IrBUS LED circuits 301 and also input to LED 305 through LED current limiting resistor 303.

FIG. 33G shows the waveform of a redundancy portion-attached DC-biased IrBUS optical signal 326 output from the optical transmission apparatus according to this embodiment. FIG. 33H shows the waveform of the base band component of redundancy portion-attached DC-biased IrBUS optical signal 326.

As described above, in the optical transmission apparatus according to this embodiment, a modulation signal according to an IrBUS method is DC-biased, the base band component is allowed to change gradually at the start and end of the packet, and therefore mutual interferences in the optical transmission apparatus may be even more reduced as compared to the optical transmission apparatuses according to the second or fourth embodiments.

Figure 35:
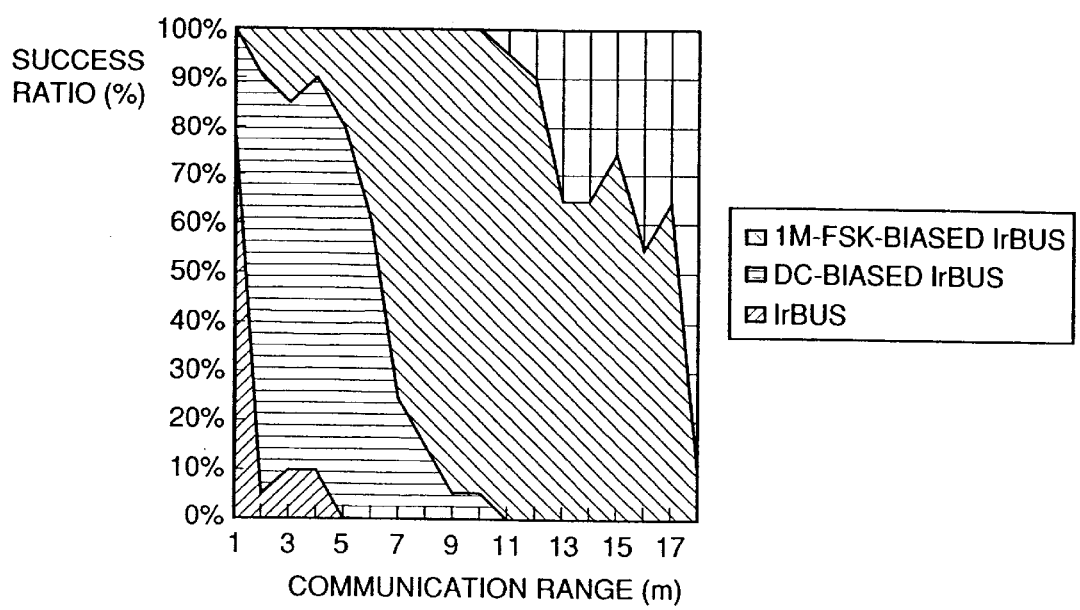
FIG. 35 is a graph showing the relation between the communication range and communication success ratio of a remote control when an optical signal according to a conventional IrBUS method, an optical signal according to the FSK-biased IrBUS method according to the fifth embodiment, and an optical signal according to the DC bias IrBUS method according to the sixth and seventh embodiments are each continuously output.

FIG. 35 is a graph showing the relation between the communication range and communication success ratio of a remote control used simultaneously with the continuous output of the optical signal in the DC bias IrBUS methods according to the sixth and seventh embodiments. The graph shows the relation between the distance between the remote control transmitter and the remote control receiver and the communication success ratio when optical signals in various methods are transmitted toward the remote control receiver from an optical transmission apparatus located 1 m separated from the remote control receiver. As can be seen from the graph, mutual interferences with the remote control are reduced according to the FSK-biased IrBUS and DC bias IrBUS methods as compared to the conventional IrBUS method.

Figure 36:
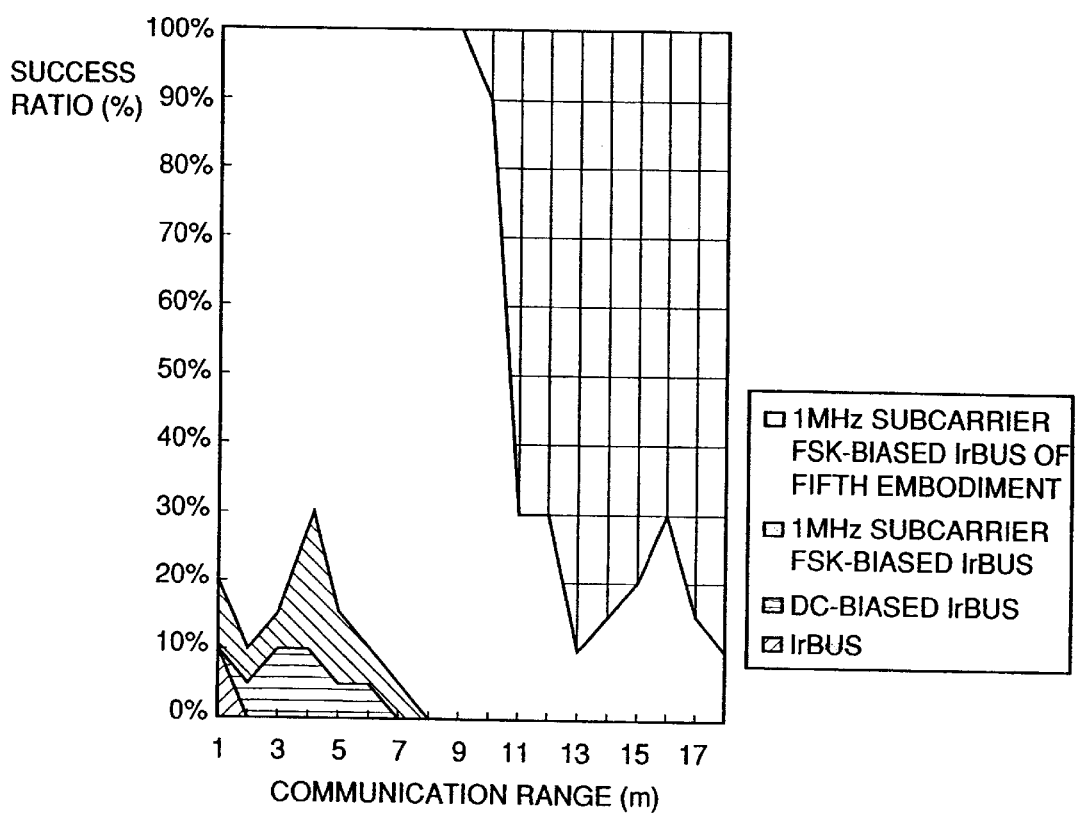
FIG. 36 is a graph showing in comparison the relation between the communication range and communication success ratio of a remote control in a conventional packet communication and in packet communications according to the first, third and fifth embodiments.

FIG. 36 shows the relation between the communication range and the communication success ratio of a remote control used while a conventional packet communication and packet communications according to the first, third and fifth embodiments are made. The graph shows the relation between the distance between the remote control transmitter and the remote control receiver and the communication success ratio when optical signals in various methods are transmitted toward the remote control receiver from an optical transmission apparatus located 1 m separated from the remote control receiver. As can be seen from the graph, the communication range and communication success ratio of the remote control may be significantly improved in the packet communication by the optical transmission apparatus according to the fifth embodiment as compared to the conventional packet communication.

Note that in the LED driving circuits according to the fourth to seventh embodiments, the same effects may be brought about with a D/A converter in place of the CMOS switch and the low-pass filter.

Eighth Embodiment

In an optical transmission apparatus according to an FSK modulation method, the present invention is applicable with the same circuit configuration as that in the fifth embodiment. In this case, a redundancy signal header and a redundancy signal tailer may be formed as a signal of a pattern different from a start flag and a stop flag or as a DC-biased signal.

Ninth Embodiment

In an optical transmission apparatus according to a PSK modulation method, the present invention is applicable with the same circuit configuration as that in the fifth embodiment. In this case, a redundancy signal header and a redundancy signal tailer may be formed as a signal of a pattern different from a start flag and a stop flag or as a DC bias.

Figures 37A, 37B:
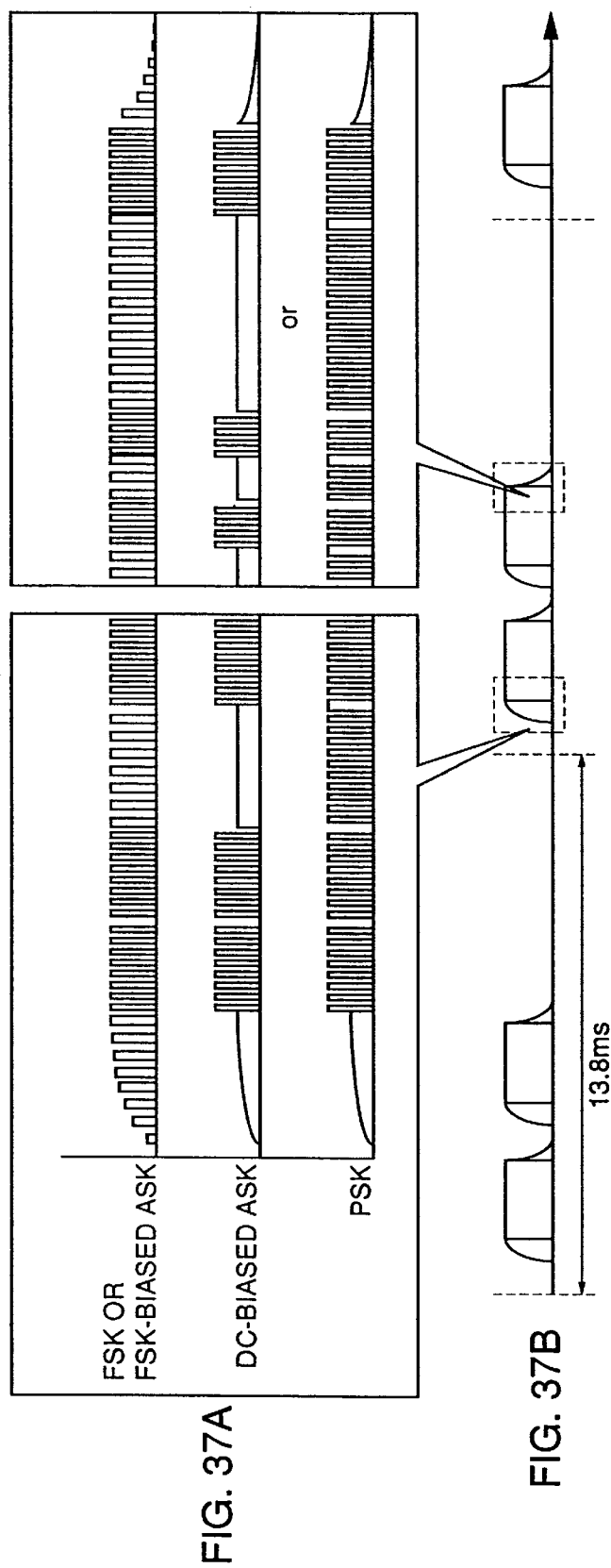
FIGS. 37A and 37B are charts showing optical signals transmitted from the optical transmission apparatuses according to seventh to ninth embodiment of the present invention.

FIGS. 37A and 37B collectively show optical signals transmitted from the optical transmission apparatuses according to the seventh to ninth embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital optical transmission apparatus, comprising:
   a modulation portion for modulating data to be transmitted in an ASK modulation method; and
   an electrical-to-optical conversion portion for converting an electrical signal output from said modulation portion into an optical signal with a constant DC level which is independent of said data to be transmitted, wherein said electrical-to-optical conversion portion sets the level of said optical signal at a DC level which is approximately equal to a DC level of an ASK subcarrier, but unrecognizable as the ASK subcarrier, while the ASK subcarrier is not output.

2. A digital optical transmission apparatus, comprising:
   a modulation portion for modulating data to be transmitted in an ASK modulation method;
   an electrical-to-optical conversion portion for converting an electrical signal output from said modulation portion into an optical signal having a base band component with a constant DC level, wherein said electrical-to-optical conversion portion includes means for DC-biasing said optical signal at an amplitude half an amplitude of a subcarrier optical signal in a location where said subcarrier optical signal is not output.

3. A digital optical transmission apparatus, comprising:

a modulation portion for modulating data to be transmitted in an ASK modulation method; and an electrical-to-optical conversion portion for converting an electrical signal output from said modulation portion into an optical signal having a base band component with a constant DC level, wherein said electrical-to-optical conversion portion includes means for outputting an optical signal having a frequency different from a frequency of said subcarrier optical signal in a location where said subcarrier optical signal is not output.

4. A digital optical transmission apparatus, comprising:

a modulation portion for modulating data to be transmitted in an ASK modulation method;

an electrical-to-optical conversion portion for converting an electrical signal output from said modulation portion into an optical signal having a base band component with a constant DC level;

a redundancy signal generation portion for attaching a redundancy signal at a start of a packet output from said modulation portion for a prescribed time period;

a switch for starting a supply of a power supply voltage at a starting time of the redundancy signal attached by said redundancy signal generation portion; and a low-pass filter supplied with the power supply voltage through said switch, said electrical-to-optical conversion portion including means for converting the electrical signal output from said modulation portion into an optical signal based on the power supply voltage output from said low-pass filter.

5. The digital optical transmission apparatus as recited in claim 4, wherein said redundancy signal generation portion includes means for attaching a DC-biased signal as a redundancy signal at the start of a packet output from said modulation portion.

6. The digital optical transmission apparatus as recited in claim 4, wherein said redundancy signal generation portion includes means for attaching an FSK-biased signal as a redundancy signal at the start of a packet output from said modulation portion.

7. The digital optical transmission apparatus as recited in claim 4, wherein said redundancy signal generation portion includes means for attaching a signal pattern symbol ignored at a time of demodulating data at the start of a packet output from said modulation portion.

8. A digital optical transmission apparatus, comprising:

a modulation portion for modulating data to be transmitted in an ASK modulation method; and an electrical-to-optical conversion portion for converting an electrical signal output from said modulation portion into an optical signal having a base band component with a constant DC level;

a redundancy signal generation portion for attaching a redundancy signal to an end of a packet output from said modulation portion for a prescribed time period;

a switch for stopping a supply of a power supply voltage at a starting time of the redundancy signal attached by said redundancy signal generation portion; and a low-pass filter supplied with the power supply voltage through said switch, said electrical-to-optical conversion portion including means for converting the electrical signal output from said modulation portion into an optical signal based on the power supply voltage output from said low-pass filter.

9. The digital optical transmission apparatus as recited in claim 8, wherein said redundancy signal generation portion includes means for attaching a DC-biased signal as a redundancy signal as a redundancy signal at the end of a packet output from said modulation portion.

10. The digital optical transmission apparatus as recited in claim 8, wherein said redundancy signal generation portion includes means for attaching an FSK-biased signal as a redundancy signal at the end of a packet output from said modulation portion.

11. The digital optical transmission apparatus as recited in claim 8, wherein said redundancy signal generation portion includes means for attaching a signal pattern symbol ignored at a time of demodulating data at the end of a packet output from said modulation portion.

12. A digital optical transmission apparatus, comprising:

a modulation portion for modulating a packet to be transmitted;

a redundancy signal generation portion for attaching a redundancy signal to a start of a packet output from said modulation portion for a prescribed time period; and an electrical-to-optical conversion circuit for gradually increasing a power supply voltage within a time period in which the redundancy signal attached by said redundancy signal generation portion is output and converting an electrical signal output from said modulation portion into an optical signal based on the power supply voltage.

13. A digital optical transmission apparatus, comprising:

a modulation portion for modulating a packet to be transmitted;

a redundancy signal generation portion for attaching a redundancy signal at an end of a packet output from said modulation portion for a prescribed time period; and an electrical-to-optical conversion circuit for gradually reducing a power supply voltage during a time period in which the redundancy signal attached by said redundancy signal generation portion is output and converting an electrical signal output from said modulation portion into an optical signal based the power supply voltage.

14. A method of a digital optical transmission including the steps of:

modulating data to be transmitted in an ASK modulation method; and converting said modulated electrical signal into an optical signal with a constant DC level which is independent of said data to be transmitted, wherein the level of said optical signal is set at a DC level which is approximately equal to a DC level of an ASK subcarrier, but unrecognizable as the ASK subcarrier, while the ASK subcarrier is not output.

15. A method of a digital optical transmission including the steps of:

modulating data to be transmitted in an ASK modulation method; and converting said modulated electrical signal into an optical signal having a base band component with a constant DC level, wherein said step of converting said modulated electrical signal into an optical signal includes the step of DC-biasing the optical signal at an amplitude half an amplitude of a subcarrier optical signal in a location where said subcarrier optical signal is not output.

16. A method of a digital optical transmission including the steps of:

modulating data to be transmitted in an ASK modulation method; and converting said modulated electrical signal into an optical signal having a base band component with a constant DC level, wherein said step of converting said modulated electrical signal into an optical signal includes the step of outputting an optical signal having a frequency different from a frequency of said subcarrier optical signal in a location where said subcarrier optical signal is not output.

17. A method of a digital optical transmission including the steps of:

modulating data to be transmitted in an ASK modulation method;

converting said modulated electrical signal into an optical signal having a base band component with a constant DC level;

attaching a redundancy signal at a start of a modulated packet for a prescribed time period; and gradually increasing a power supply voltage during a time period in which said attached redundancy signal is output and converting said modulated electrical signal into an optical signal based on the power supply voltage.

18. The method as recited in claim 17, wherein said step of attaching said redundancy signal includes attaching a DC-biased signal as the redundancy signal at the start of said modulated packet.

19. The method as recited in claim 17, further comprising the step of attaching an FSK-biased signal as the redundancy signal at the start of said modulated packet.

20. The method as recited in claim 17, wherein said step of attaching the redundancy signal includes the step of attaching a signal pattern symbol ignored at the time of demodulating data at the start of said modulated packet.

21. A method of a digital optical transmission including the steps of:

modulating data to be transmitted in an ASK modulation method;

converting said modulated electrical signal into an optical signal having a base band component with a constant DC level;

attaching a redundancy signal to an end of a modulated packet for a prescribed time period; and gradually reducing the power supply voltage during a time period in which said attached redundancy signal is output and converting said modulated electrical signal into an optical signal based on the power supply voltage.

22. The method as recited in claim 21, further comprising the step of attaching a DC-biased signal as the redundancy signal at the end of said modulated packet.

23. The method as recited in claim 21, wherein said step of attaching said redundancy signal includes the step of attaching an FSK-biased signal as the redundancy signal at the end of said modulated packet.

24. The method as recited in claim 21, wherein said step of attaching the redundancy signal includes the step of attaching a signal pattern symbol ignored at a time of demodulating data at the end of said modulated packet.

25. A method of digital optical transmission, comprising the steps of:

modulating a packet to be transmitted;

attaching a redundancy signal at a start of said modulated packet for a prescribed time period; and gradually increasing a power supply voltage during a time period in which said attached redundancy signal is output and converting said modulated electrical signal into an optical signal based on the power supply voltage.

26. A method of digital optical transmission, comprising the steps of:

modulating a packet to be transmitted;

attaching a redundancy signal at an end of said modulated packet for a prescribed time period; and gradually reducing a power supply voltage during a time period in which said attached redundancy signal is output and converting a modulated electrical signal into an optical signal based on the power supply voltage.

* * * * *